(12) United States Patent
Demaray et al.

(10) Patent No.: US 11,824,183 B2
(45) Date of Patent: *Nov. 21, 2023

(54) ENERGY STORAGE DEVICE WITH A FIRST METAL LAYER FORMED FROM A PRECURSOR LAYER UPON CHARGE AND DIFFUSED INTO A CATHODE DURING DISCHARGE

(71) Applicant: DEMARAY, LLC, Portola Valley, CA (US)

(72) Inventors: R. Ernest Demaray, Portola Valley, CA (US); James Kaschmitter, Pleasanton, CA (US); Pavel Khokhlov, Belmont, CA (US)

(73) Assignee: DEMARAY, LLC, Portola Valley, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 17/077,844

(22) Filed: Oct. 22, 2020

(65) Prior Publication Data

US 2021/0151734 A1 May 20, 2021

Related U.S. Application Data

(63) Continuation of application No. 15/590,887, filed on May 9, 2017, now Pat. No. 10,818,909.

(Continued)

(51) Int. Cl.
*H01M 4/13* (2010.01)
*H01M 4/04* (2006.01)
(Continued)

(52) U.S. Cl.
CPC .......... *H01M 4/0423* (2013.01); *C01G 23/00* (2013.01); *H01M 4/0404* (2013.01); *H01M 4/13* (2013.01);
(Continued)

(58) Field of Classification Search
None
See application file for complete search history.

(56) References Cited

U.S. PATENT DOCUMENTS 6,506,289 B2  1/2003  Demaray et al.
6,533,907 B2  3/2003  Demaray et al.
(Continued)

OTHER PUBLICATIONS

B. Nykvist and M. Nilsson titled Rapidly Falling Costs of Battery Packs for Electric Vehicles. Nature Climate Change, 2015. 5(4): pp. 329-332.

(Continued)

*Primary Examiner* — Lucas J. O'Donnell
(74) *Attorney, Agent, or Firm* — HAYNES AND BOONE, LLP

(57) ABSTRACT

Embodiments of the present invention are in the field of materials, apparatus, process, methods, and designs for manufacture of a thin film energy storage devices with a capacity greater then 1 mA-hr-cm$^{-2}$ including thin film Lithium metal and Li+ ion batteries and capacitors having high energy density and high cycle life due to the incorporation of at least one vacuum thin film with respect to protection and electrical conductivity of the electrodes, and at least one vacuum thin film electrolyte for electrical insulation of the electrodes and ion conduction after assembly for low self discharge and high cycle life battery cells.

20 Claims, 18 Drawing Sheets

Related U.S. Application Data

(60) Provisional application No. 62/333,782, filed on May 9, 2016.

(51) Int. Cl.

| | | |
|---|---|---|
| *H01M 4/36* | (2006.01) | |
| *H01M 10/42* | (2006.01) | |
| *H01M 4/66* | (2006.01) | |
| *H01M 10/0585* | (2010.01) | |
| *H01M 10/052* | (2010.01) | |
| *H01M 4/139* | (2010.01) | |
| *C01G 23/00* | (2006.01) | |
| *H01M 4/64* | (2006.01) | |
| *H01M 10/04* | (2006.01) | |

(52) U.S. Cl.
CPC ........... *H01M 4/139* (2013.01); *H01M 4/366* (2013.01); *H01M 4/64* (2013.01); *H01M 4/667* (2013.01); *H01M 10/052* (2013.01); *H01M 10/0585* (2013.01); *H01M 10/4235* (2013.01); *H01M 10/0436* (2013.01)

(56) References Cited

U.S. PATENT DOCUMENTS

| 6,827,826 | B2 | 12/2004 | Demaray et al. |
|---|---|---|---|
| 6,884,327 | B2 | 4/2005 | Pan et al. |
| 7,205,662 | B2 | 4/2007 | Narasimhan et al. |
| 7,238,628 | B2 | 7/2007 | Demaray et al. |
| 7,262,131 | B2 | 8/2007 | Narasimhan et al. |
| 7,378,356 | B2 | 5/2008 | Zhang et al. |
| 7,381,657 | B2 | 6/2008 | Zhang et al. |
| 7,413,998 | B2 | 8/2008 | Zhang et al. |
| 7,469,558 | B2 | 12/2008 | Demaray et al. |
| 7,544,276 | B2 | 6/2009 | Zhang et al. |
| 7,826,702 | B2 | 11/2010 | Dawes |
| 7,838,133 | B2 | 11/2010 | Zhang et al. |
| 8,045,832 | B2 | 10/2011 | Pan et al. |
| 8,076,005 | B2 | 12/2011 | Demaray et al. |
| 8,105,466 | B2 | 1/2012 | Zhang et al. |
| 10,608,241 | B2 | 3/2020 | Balogh et al. |
| 10,818,909 | B2 * | 10/2020 | Demaray ............. H01M 4/667 |
| 2003/0175142 | A1 | 9/2003 | Milonopoulou et al. |
| 2004/0137326 | A1 | 7/2004 | Munshi |
| 2007/0172739 | A1 | 7/2007 | Visco et al. |
| 2009/0246636 | A1 | 10/2009 | Chiang et al. |
| 2010/0291444 | A1 | 11/2010 | Farmer et al. |
| 2014/0140659 | A1 | 5/2014 | Demaray |
| 2017/0288281 | A1 * | 10/2017 | Chiang ................ H01M 4/134 |

OTHER PUBLICATIONS

C. Monroe and J. Newman titled the Impact of Elastic Deformation on Deposition Kinetics at Lithium/Polymer Interfaces. Journal of the Electrochemical Society, 2005. 152(2): pp. A396-A404.

G. Stone, S. Mullin, A. Teran, D. Hallinan, A. Minor, A. Hexemer and N. Balsara titled Resolution of the Modules Versus Adhesion Dilemma in Solid Polymer Electrolytes for Rechargeable Lithium Metal Batteries. Journal of the Electrochemical Society, 2012. 159(3): pp. A222-A227.

Y. Ren, Y. Shen, Y. Lin and C. W. Nan titled Direct Observation of Lithium Dendrites Inside Garnet-Type Lithium-Ion Solid Electrolyte. Electrochemistry Communications, 2015. 57: pp. 27-30.

Z. Deng, Z. Wang, I. H. Chu, J. Luo and S. P. Ong titled Elastic Properties of Alkali Superionic Conductor Electrolytes from First Principles Calculations. Journal of the Electrochemical Society, 2016. 163(2): pp. A67-A74.

E. Herbert, W. E. Tenhaeff, N. J. Dudney and G.Pharr titled Mechanical Characterization of LiPON Films Using Nanoindentation. Thin Solid Films, 2011. 520(1): pp. 413-418.

N. Kamaya, K. Homma, Y. Yamakawa, M. Hirayama, R. Kanno, M. Yonemura, T. Kamiyama, Y. Kato, S. Hama and K. Kawamoto titled a Lithium Superionic Conductor. Nature Materials, 2011. 10(9): pp. 682-686.

P. Bron, S. Johansson, K. Zick, J. R. Schmedt Auf Der Gunne, S. Dehnen and B. Roling titled Li 10SnP2S12: An Affordable Lithium Superionic Conductor. Journal of the American Chemical Society, 2013. 135(42): pp. 15694-15697.

A Kuhn, O. Gerbig, C. Zhu, F. Falkenberg, J. Maier and B. V. Lotsch titled A New Ultrafast Superionic Li-Conductor: Ion Dynamics in Li 11 Si 2 PS 12 and Comparison With Other Tetragonal LGPS-Type Electrolytes. Physical Chemical Physics, 2014. 16(28): pp. 14669-14674.

B.A. Movchan, A.V. Demchishin, Fizika Metallov i Metallovedenie titled Physics of Metals and Metallography 28 (1969) 653 Paton Inst. Elec. Welding, Kiev USSR.

J.B.Goodenough et al. titled Review Solid Electrolytes in Rechargeable Electrochemical Cells, J. Electrochem. Soc. (2015) 165 (14) A2387-A2392.

Yuki Kato et al. titled High-Power All-Solid-State Batteries Using Sulphide Superionic Conductors, Nature Energy, Mar. 21, 2016, No. 16030 / DOI: 10.1038/NENERGY.2016.30.

J. K. Stark, Y. Ding, and P. A. Kohl, titled Nucleation of Electrodeposited Lithium Metal: Dendritic Growth and the Effect of Co-Deposited Sodium, J. Electrochem. Soc. 160 (9) D337-D342 (2-13).

G. Vladimir, Lee S. Mock and 0. Viktoria titled Electrochemical Behavior of Intermetallic Compounds During Insertion/Dissolution of Lithium, Samsung Advance Institute of Technology SAIT, Box 111 Suwon 440-600 Korea, Department of Electrochemistry, Rostov State University Zorge street, 7 Rostov-on-Don 344090 Russia, ISSN 1023-1935, Russian J. of Electrochem. 2007, V.43, No. 12, Pleiades, Ltd, 2007. pp. 1398-1405.

Written Opinion of the International Searching Authority issued on PCT/US2017/031821 by the U.S. Search Authority (dated Aug. 11, 2017), pp. 1-4.

International Search Report issued on PCT/US2017/031821 by the U.S. Search Authority (dated Aug. 11, 2017), pp. 1-2.

(Not Submitted) M. Verbrugge et al. titled Electrochemistry and Transport Phenomena of the Lithium-Silicon System: Modeling and Open Questions 32nd Annual International Battery Seminar and Exhibition, Mar. 2015, Fort Lauderdale, Florida.

Mark Verbrugge et al. "Electrochemistry and Transport Phenomena of the Lithium-Silicon System: Modeling and Open Questions," The 32nd Annual International Battery Seminar & Exhibition. Power point presentation. (Mar. 9-12, 2015). pp. 1-28.

KR20002017790 Derwent Abstract (Year: 2002).

* cited by examiner

| | Cathode Foil, Microns | NMC, Microns | TFSSE/ Separator, Microns | Cu Foil, Microns | Gravimetric Energy Density, Wh/kg | Volumetric Energy Density, Wh/L |
|---|---|---|---|---|---|---|
| ARPAe-IONICS[11] | | | | | 400 | 1000 |
| Composite Electrolyte 1 | 15 | 152 | 30 | 8 | 468 | 1193 |
| Composite Electrolyte 2 | 15 | 152 | 15 | 8 | 508 | 1292 |
| HC-TFB 1 | 15 | 152 | 2 | 8 | 548 | 1393 |
| HC-TFB 2 | 2 | 152 | 2 | 2 | 601 | 1486 |
| HC-TFB 3 | 1 | 152 | 1 | 1 | 613 | 1507 |
| HC-TFB 4 | 1 | 152 | 0.5 | 1 | 615 | 1512 |

FIG. 4

Single-sided Anode-separator Stack

Double-sided Anode-separator Stack

Double-sided Cathode Electrode

Full Cell Stacked

Full Cell Rolled

| Product Type | Tensile Test (Room Temperature) | | | | Surface Roughness | | | |
|---|---|---|---|---|---|---|---|---|
| | Before Heating | | After Heating (130°C, 10mins) | | Drum Side | | Deposited Side | |
| | Tensile Strength | Stretch | Tensile Strength | Stretch | Ra | Rz | Ra | Rz |
| | Mpa | % | Mpa | % | μm | μm | μm | μm |
| 6 micron Foil* | 342 | 8.4 | 325 | 9.5 | 0.2 | 1.8 | 0.2 | 1.9 |
| 8 micron Foil | 334 | 10.7 | 320 | 11.9 | 0.2 | 1.8 | 0.2 | 1.8 |
| 10 micron Foil | 334 | 12.9 | 321 | 14 | 0.2 | 1.8 | 0.2 | 1.7 |
| 15 micron Foil* | 330 | 17.3 | 322 | 20.5 | 0.2 | 1.8 | 0.2 | 1.6 |

FIG. 17

| Nominal Thickness | Microns | 10 | 12 | 18 |
|---|---|---|---|---|
| Tensile | Ambient | 65 | 65 | 60 |
| Elongation | Ambient | 4 | 7 | 10 |
| Roughness - Ra | Drum | 14 | 14 | 14 |
| Roughness - Rz | Drum | 100 | 100 | 100 |
| Roughness - Ra | Matte | 18 | 20 | 23 |
| Roughness - Rz | Matte | 115 | 120 | 145 |

Fig. 4. Degree of Planarization.

ENERGY STORAGE DEVICE WITH A FIRST METAL LAYER FORMED FROM A PRECURSOR LAYER UPON CHARGE AND DIFFUSED INTO A CATHODE DURING DISCHARGE

RELATED APPLICATIONS

The present application is a continuation of U.S. patent application Ser. No. 15/590,887, entitled "An Energy Storage Device with a First Metal Layer Formed from a Precursor Layer Upon Charge and Diffused into a Cathode During Discharge," by R. Ernest Demaray, James Kaschmitter, and Pavel Khokhlov, filed on May 9, 2017, which claims priority to U.S. Application Ser. No. 62/333,782, entitled "Thin Film Battery with High Capacity, Energy Density and Cycle Life," by R. Ernest Demaray, James Kaschmitter, and Pavel Khokhlov, filed on May 9, 2016, which are herein incorporated by reference in their entireties.

BACKGROUND

Field of Invention

The present invention is related to the manufacture of thin film energy storage devices and to the manufacture of thin film batteries with high capacity energy density and cycle life.

Discussion of Related Art

Li-ion batteries are currently in a phase of massive commercial adoption and manufacturing scale-up that will lower costs and enable the growth of electrical energy storage products and service for mobile, vehicle and stationary power and communication market segments. However, products based on Li-ion technology being scaled up today have a number of major performance limitations that have not been subject to simultaneous incremental progress. First, the energy density is limited by the amount of charge that can be practically stored via intercalation in the cathode volume and transferred through a composite electrolyte layer or separator volume for storage in an anode volume. The bulk layers, even the cathode layer, add volume and mass that limits the volumetric and gravimetric energy density. Second, the resistivity of the bulk electrolyte produces heat that thermally-activates degradation modes that limit the upper operating temperature to about 50° C. This leads to a requirement for cooling systems that result in lower battery capacity. Third, Electrolytes and separators develop lithium dendritic filament growth into their porosity or grain boundaries, which leads to loss of capacity and limits cycle life to below about 500 cycles due to degradation of capacity and filament induced shorting. (e.g., Panasonic CGR18650CG Rechargeable 3.6V Li-ion 18650 Battery 2250 mAh, 3008, 80% at 300 cycles, Panasonic NCR 18650b 3400 mAH 3.7 V Battery, 90% at 400 cycles. Fourth, liquid electrolyte related water or moisture induced decomposition and corrosion of the cathode, electrolyte and anode has been observed.

Overcoming these performance limitations opens a path to higher energy density with cost at or below 100 $/kWh and pack costs well below 175 $/kWh, which would surpass the approximate limits of present Li-ion bulk layer technology. (B. Nykvist and M. Nilsson, Rapidly falling costs of battery packs for electric vehicles. Nature Climate Change, 2015. 5(4): p. 329-332.)

Cycling of Li metal without shorting has been a goal in the battery community for decades, however it has been successfully proven only in thin-film cells based on LiPON solid electrolyte with low areal capacity, which creates serious limitations as discussed in the context of FIGS. 1A and 1B. FIG. 1A shows a scanning electron microscope (SEM) fracture cross section of three layers of a thin-film battery (TFB) 100. FIG. 1A illustrates TFB 100 formed with a conductive barrier film 106, a $LiCoO_2$ crystalline cathode 104 formed over the conductive barrier film 106, and a LiPON amorphous electrolyte 102 formed over the $LiCoO_2$ layer 104. The micrograph shows the "columnar" morphology of the $LiCoO_2$ cathode layer 104. The $LiCoO_2$ cathode layer is shown between a sputtered conductive barrier layer 106, protecting a cathode foil (not shown) and an amorphous, glassy RF bias planarized LiPON electrolyte layer 102. FIG. 1B shows an SEM fracture cross section of about 2 micron thick LIPON layer 108.

While an understanding of the fundamental engineering aspects to cycle Li metal continues to mature, an important theoretical paradigm (with some empirical support) is that a separator material with a shear modulus approximately twice that of Li metal itself is sufficient to block dendrites. (C. Monroe and J. Newman, The impact of elastic deformation on deposition kinetics at lithium/polymer interfaces. Journal of The Electrochemical Society, 2005. 152(2): p. A396-A404; G. Stone, S. Mullin, A. Teran, D. Hallinan, A. Minor, A. Hexemer, and N. Balsara, Resolution of the modulus versus adhesion dilemma in solid polymer electrolytes for rechargeable lithium metal batteries. Journal of The Electrochemical Society, 2012. 159(3): p. A222-A227). LiPON far exceeds this threshold, although it should be noted that some solid electrolytes (e.g., the Garnet material of conductive barrier layer 106 discussed in the context of FUGS. 1A and 1B) do allow Li penetration through grain boundaries even though they have a sufficient shear modulus. (Y. Ren, Y. Shen, Y. Lin, and C.-W. Nan, Direct observation of lithium dendrites inside garnet-type lithium-ion solid electrolyte. Electrochemistry Communications, 2015. 57: p. 27-30; Z. Deng, Z. Wang, I.-H. Chu, J. Luo, and S. P. Ong, Elastic Properties of Alkali Superionic Conductor Electrolytes from First Principles Calculations. Journal of The Electrochemical Society, 2016. 163(2): p. A67-A74; and E. Herbert, W. E. Tenhaeff, N. J. Dudney, and G. Pharr, Mechanical characterization of LiPON films using nanoindentation. Thin Solid Films, 2011. 520(1): p. 413-418).

Recent years have seen developments in the area of Li-conducting solid electrolytes. Noteworthy is the 2011 report of $Li10GeP_2S12$ (LGPS) that has an ionic conductivity greater than typical commercial Li-ion electrolytes. (N. Kamaya, K. Homma, Y. Yamakawa, M. Hirayama, R. Kanno, M. Yonemura, T. Kamiyama, Y. Kato, S. Hama, and K. Kawamoto, A lithium superionic conductor. Nature Materials, 2011. 10(9): p. 682-686). Sn and Si versions of that material have also been prepared that have roughly equivalent conductivity to the Ge version. (P. Bron, S. Johansson, K. Zick, J. r. Schmedt auf der Giinne, S. Dehnen, and B. Roling, $Li10SnP_2S12$: an affordable lithium superionic conductor. Journal of the American Chemical Society, 2013. 135(42): p. 15694-15697; A. Kuhn, O. Gerbig, C. Zhu, F. Falkenberg, J. Maier, and B. V. Lotsch, A new ultrafast superionic Li-conductor: Ion dynamics in $Li11Si2PS12$ and comparison with other tetragonal LGPS-type electrolytes. Physical Chemical Physics, 2014. 16(28): p. 14669-14674). But these electrolyte materials are reported to be susceptible to degradation by moisture and they have lower ionic strength than metal oxides or oxy-nitrides.

The formation of a so-called solid electrolyte interface (SEI), which is formed by reaction of electrolyte and/or electrolyte additives on a surface, is thought to improve performance. This SEI does not protect from dendrite formation as the SEI is soft usually polymeric or polycrystalline layer of some Li salt.

The fundamental challenge with the use of liquid reactants is that realizing their promise of high cycle life can be accomplished in only two ways: (1) use a separator with essentially perfect selectivity for a common ion that passes between the electrodes (e.g., a solid Li+-conducting solid electrolytes such as LIPON), or (2) find a liquid reactant for which crossover does not lead to permanent cell degradation but only a loss in efficiency. The challenge in case (1) is that it requires a "perfectly" selective and "defect free" separator such as LIPON but at a low-cost which is both needed and by example of both the DOE BEEST and IONICS, long anticipated but not achieved.

The portable electronics industry is increasingly constrained by limited further reduction of battery volume as Li-ion battery technology matures. The state-of-the-art reference is Panasonic's 3.6V, 3400 mAhr NCR18650B cylindrical battery, with 676 Wh/L, gravimetric capacity of 243 Wh/kg, and a cycle life of 500 cycles at 90% capacity. Although one skilled in the art will recognize that a large increase in cycle life can be had by limiting the range of charge/discharge cycles, the high self-discharge alone prevents use of this battery for prolonged energy storage or operation outside a narrow optimum range of temperature. "Pouch" cells used in portable cell phones, tablets, etc. typically have slightly lower energy density due to packaging.

The state-of-the-art in anodes is graphite, both natural and synthetic with about 350 mAhr/gm. To avoid plating Lithium metal on the anode for safety, the anode has to be oversized relative to the cathode. This extra capacity insures the anode can absorb all of the Li+ coming from the cathode during charging, but is excess volume. Recent efforts have focused on using pure Silicon, Silicon/Carbon mixtures and Silicon alloys (e.g. with Tin) as anode materials, which form compounds with lithium near the metal reduction potential. These materials have higher capacity, but suffer from a plethora of problems, such as excessive swelling on charging, lower average cell voltage, lower first cycle efficiency, lower density, higher cost, mechanical cracking and irreversible decrease in lithium availability. (M. Verbrugge, et. al "Electrochemistry and transport phenomena of the lithium-silicon system: modeling and open questions", 32nd Ann. Int. Battery Seminar and Exhibition, March 2015, Ft. Laud. FL).

A recent review by John Goodenough, concluded,
" . . . the $Li^+$ conductivity at room temperature in a crystalline ceramic remains too low to allow use of a thick . . . electrolyte which has restricted their use since thin ceramic membranes are not mechanically robust unless supported or in a composite with a polymer. Although a Lithium anode can be plated across a dense garnet film from which water and $CO_2$ have been removed, low-cost fabrication of large-area garnet $Li^+$ electrolytes . . . remains a challenge."
(J. B. Goodenough, et. Al., Review Solid Electrolytes in Rechargeable Electrochemical Cells, J. Electrochem. Soc. 165 (14) A2387-A2392 (2015)).

With the common view that of Goodenough, progress on a solid-state electrolyte (SSE) has centered on hybrid SSEs. As has been described, "hybrid SSEs with a highly conductive inorganic crystalline powder in a polymer binder . . . has recently demonstrated conductivities up to 25 e-3 S/cm and columbic efficiency up to 90%. But progress with Hybrid SSEs has been slow. Sheeting technology for manufacturing has been proven without liquid additives but remains a challenge. Hybrid SSEs have not demonstrated high cycle life, high current density charging or high cycle charge retention without shorting due to sheeting defects, porosity, dendrite growth and [are] particularly susceptibility to water vapor permeation as well as a factor of two or more in cycle life as contrasted with liquid electrolyte." (High-power all-solid-state batteries using sulphide superionic conductors, Yuki Kato, et. al, Nature Energy, 21 Mar. 2016, no. 16030 | DOI: 10.1038/NENERGY.2016.30).

Stark et. al. state that "Lithium metal anodes are a possible route to achieving high energy and power density due to their light weight compared to current graphite anodes. However, whisker growth during lithium electrodeposition (i.e. charging) represents a serious safety and efficiency concern for both lithium metal batteries and overcharging of graphite anodes in lithium-ion batteries". (J. K. Stark, Y. Ding, and P. A. Kohl, "Nucleation of Electrodeposited Lithium Metal: Dendritic Growth and the Effect of Co-Deposited Sodium", J. Electrochem. Soc. 160 (9) D337-D342 (2-13)). They conclude that " . . . ceramic electrolyte solves the dendrite problem by providing a physical barrier to dendrite growth. While dendrites are known to grow through separators and even polymers, the ceramic electrolyte is an effective physical barrier." However they find no suitable solid electrolyte and so go on to study dendrite formation from organic and liquid phases.

Consequently, there is a need for improved materials to form thin film solid state electrolyte battery structures.

SUMMARY

In accordance with some embodiments of the present disclosure, a device that forms a lithium-metal battery cell upon initial application of a voltage to the device is presented. The includes a first electrode structure; a second electrode structure containing lithium ions; and one or more layers deposited over the first electrode structure, the one or more layers including an electrolyte precursor layer with a planarized electrical insulating ion conducting layer deposited over the first electrode, the one or more thin-film layers separating the first electrode and the second electrode. The first electrode structure, the second electrode structure, and the electrolyte precursor layer are configured such that, upon initial application of the voltage across the first electrode structure and the second electrode structure to form the lithium-metal battery cell, lithium ions flow from the second electrode structure to the first electrode structure through the electrolyte precursor layer, a lithium conducting electrolyte is formed from the electrolyte precursor layer during lithium ion flow, a layer of lithium metal is deposited on the first electrode structure to form an anode where the first electrode structure and the one or more thin-film layers form a current collector electrode, and a cathode is formed from the second electrode structure.

A method of forming a battery cell according to some embodiments of the present disclosure includes providing for one or more layers between a first electrode structure and a second electrode structure containing an ion material, the one or more layers including an electrolyte precursor layer with a planarized electrical insulating ion conducting layer; and applying a voltage between the first electrode structure and the second electrode structure to provide ion flow from the second electrode structure to the first electrode structure through the electrolyte precursor layer, form an ion conducting electrolyte from the electrolyte precursor layer during the ion flow, deposit a layer of metal on the first electrode structure to form an anode where the first electrode structure and the one or more thin-film layers form a current collector electrode, and form a cathode from the second electrode structure.

In some embodiments, a device capable of formation into a lithium-metal battery upon initial application of a voltage is presented. The device includes a first electrode having a first electrical contact; an electrolyte precursor layer including an RF plasma planarized electrical insulating layer sputter deposited on and extending over an area of the first electrode; a lithium containing layer formed on the planarized electrical insulating layer; and a second electrode electrically coupled to the lithium containing layer and having a second electrical contact. Applying the voltage between the first electrical contact and the second electrical contact causes lithium ions to flow from the lithium containing layer to the first electrode structure through the electrolyte precursor layer, creates a lithium containing electrolyte and lithium containing intermetallic precursor layer from the electrolyte precursor layers, and deposits a layer of lithium metal on the first electrode to form a lithium-metal battery.

These and other embodiments are further discussed below with reference to the following figures. It is to be understood that both the foregoing general description and the following detailed description are exemplary and explanatory only and are not restrictive of the invention, as claimed. Further, specific explanations or theories regarding the deposition or performance of materials according to the present invention are presented for explanation only and are not to be considered limiting with respect to the scope of the present disclosure or the claims.

BRIEF DESCRIPTION OF FIGURES

FIG. 4 shows a table which compares gravimetric and volumetric energy capacity for various projected battery designs.

FIG. 17 shows a Cu foil specification chart.

DETAILED DESCRIPTIONS

Figure 1A:
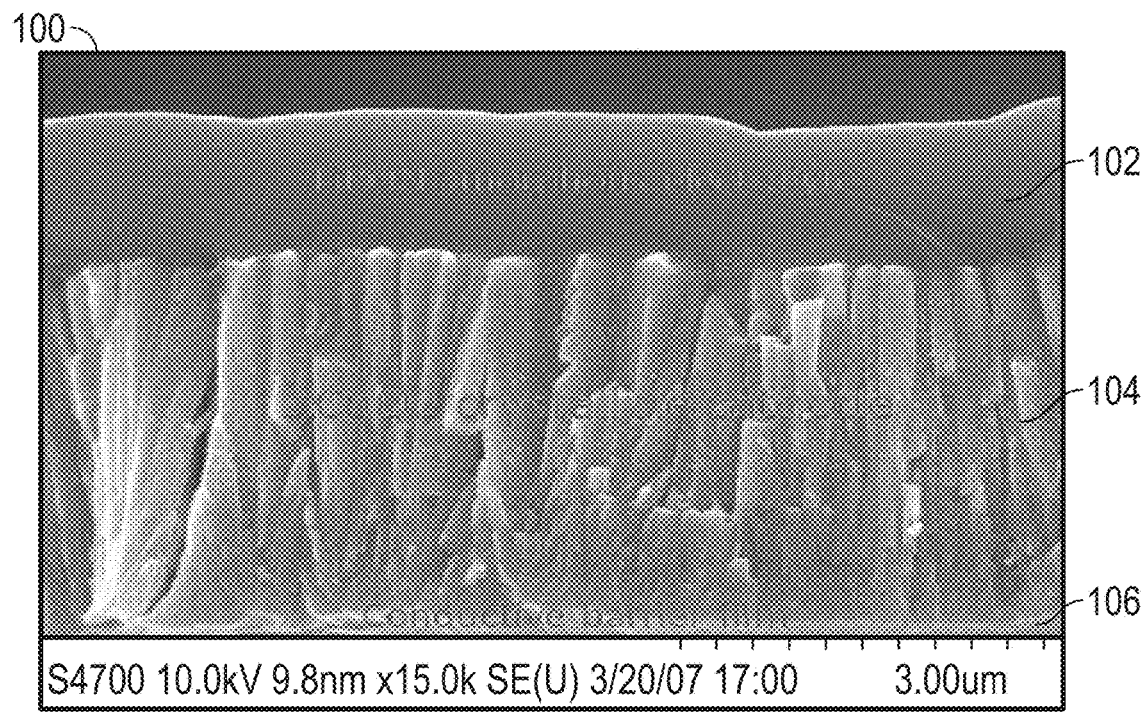
FIG. 1A shows an SEM fracture cross section of three layers of a thin-film battery.
Figure 1B:
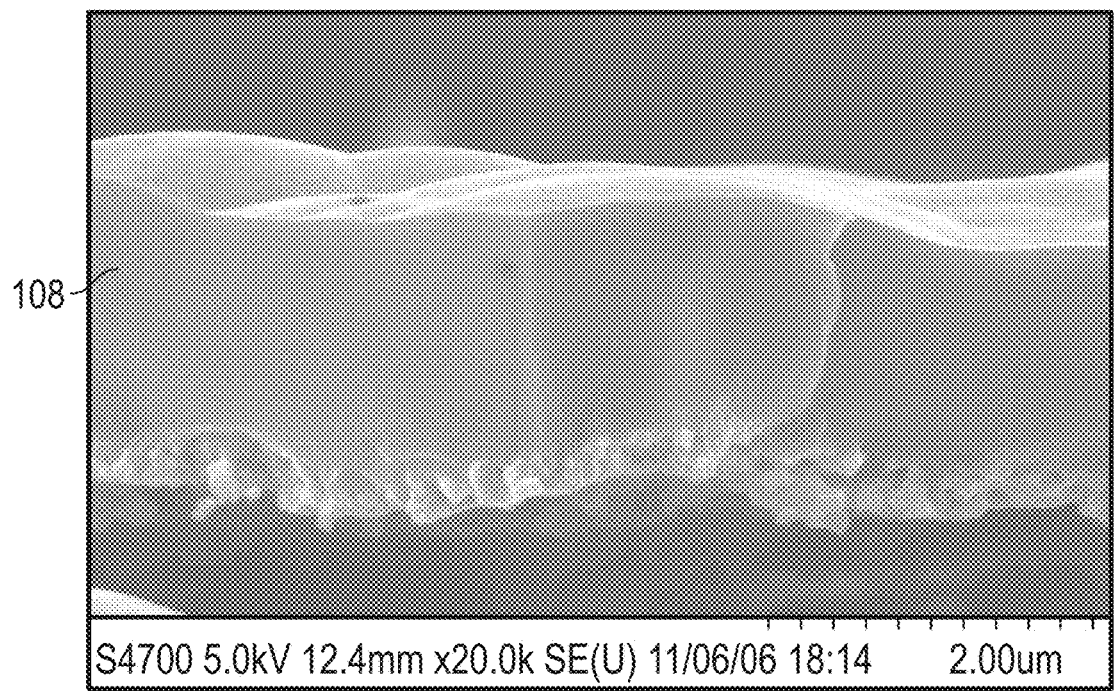
FIG. 1B shows an SEM fracture cross section of about 2 micron thick amorphous RF Biased sputtered UPON electrolyte.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Throughout the specification, the terms "over", "below", "above" or the like refer to relative orientations of one component with respect to the other components in the structure and does not refer to the absolute orientation of any component or structure relative to any external reference. The term "on" refers to a component of the structure that is in contact with another component of the structure.

The following acronyms are used throughout the specification:

TF-SSE—Thin Film Solid State Electrolyte;

HC-TFB—High Capacity Thin Film Battery;
HC-TFC—High Capacity Thin Film Capacitor;
BPDC—Biased Pulsed DC Reactive Sputtering;
"defect free"—having less than 1 conductive through-hole pinhole or columnar through-film defect per device unit area;
MEMS—Micro Electro-Mechanical System;
NCM—Nickel Cobalt Manganese Oxide;
ASR—Area Specific Resistivity;
TF-SSB—Thin Film Solid State Battery; and
NMC—National Material Composite.

The performance limitations of the lithium battery described above have a high potential to be addressed by embodiments of the present invention. Some embodiments cover a thin-film solid-state electrolyte (TF-SSE) that is fully dense, possesses a modulus greater than that of Lithium metal, is stable with respect to Lithium metal and is free of grain boundaries. For example, a TF-SSE with Li+ ion conductivity at room temperature in the range of e-3 to e-5 S-cm$^{-1}$, having a thickness in the micron or sub-micron range, may provide an area resistivity in the range less than 1 Ohm-cm$^{-2}$. In addition, such a solid-state film will be resist filament growth, resulting in long cycle life when assembled with a high capacity cathode. A stable TF-SSE that is also a single layer moisture barrier protects Li-metal reduced at the anode without degradation of the anode material or the TF-SSE as described below.

An energy storage device according to some embodiments is formed. An energy storage device according to some embodiments includes a first electrode; one or more thin-film layers deposited on the first electrode; a second electrode with a calendared ion containing layer in contact with the one or more thin-film layers, wherein the one or more thin film layers provides electrical isolation and ionic conductivity between the first electrode and the second electrode.

In some embodiments, the one or more thin film layers includes a collector film that protects the first electrode from degradation. In some embodiments, e.g. where the ions are lithium metal ions, the collector film is a planarized Ti/TiN layer. In some embodiments, the one or more thin film layers includes an intermetallic lithium precursor layer. In some embodiments, the intermetallic lithium precursor layer is a Mg3N2 layer. In some embodiments, the one or more thin film layers includes a thin-film solid state electrolyte precursor layer. In some embodiments, the thin-film solid stat electrolyte precursor layer is a dielectric thin film. In some embodiments, the one or more thin films are impregnated or combined with ions from the second electrode during operation, e.g. when lithium metal ions are used, the one or more thin films are lithiated to contain lithium. In some embodiments, at least one of the one or more thin films contains the ionic material of the second electrode, e.g. lithium metal when the second electrode includes lithium metal ions. In some embodiments, the at least one of the one or more thin films is deposited by RF biased reactive sputtering. In some embodiments, the at least one of the one or more thin films is an amorphous, planarized film. In some embodiments, one of the first electrode joined to the second electrode has greater than 1 mA-hr cm-2 capacity. In some embodiments, at least one of the one or more thin films are formed with a nitride, oxide, sulfide, or halogen compound. In some embodiments, the ionic conduction includes one or more of Li+, Na+, Zn++, Al+++ or other ions. In some embodiments, the a second electrode with the calendared ion containing layer in contact with the one or more thin-film layers is formed by 3D printing.

A method of forming a battery cell includes depositing one or more thin films on a first electrode; calendaring an ion containing layer on a second electrode; joining the first electrode with the second electrode such that the one or more thin films is in contact the ion containing layer; and impregnated the one or more thin films with ions from the ion containing layer to form the battery cell. For example, when the ion containing layer contains lithium metal ions, the one or more thin films are lithiated to form the battery cell by applying a voltage to the electrodes to cause lithium metal ions to flow between them. In some embodiments, depositing one or more films on an opposite side of the first electrode and joining with another second electrode on the opposite side of the first electrode to form a double layer cell after lithiating (or equivalent combining process, when the ions that are conducted are something other than lithium, e.g. a different alkalai metal). In some embodiments, the battery cell further includes multiple pairs of the first electrode and the second electrode. In some embodiments, lithiating (or equivalent combining process, when the ions that are conducted are something other than lithium, e.g. a different alkalie metal) the one or more thin films includes charging the battery cell to move ions into the one or more thin films. In some embodiments, joining the first electrode with the second electrode includes positioning the second electrode relative to the first electrode, and providing a pressure during lithiation and cyclic operation.

In some embodiments, the TF-SSE is deposited as a Lithium-free film on the anode. However, in some embodiments the TF-SSE may be deposited as a Lithium containing film on the anode. Such depositions can be performed by RF-biased pulsed-DC reactive sputtering (BPDC) processes which may provide fully dense and amorphous TF-SSE films.

Embodiments of the present invention relate to the field of materials, apparatus, process, methods, and designs for manufacture of a high capacity thin film energy storage devices including high capacity thin film battery (HC-TFB) with Lithium and Li+ ion and capacitors having high capacity, high energy density and high cycle life due to the incorporation of at least one thin film which is defect free with respect to electrical insulation of the electrodes, permeation of water vapor, failure due to the mechanical stress of manufacture or change in layer volumes as well as resistant to filament growth related to shorting for high cycle life.

Embodiments of the present invention include one or more methods of depositing a micron or sub-micron thin film solid state electrolyte (TF-SSE) to separate a high capacity cathode from an anode electrically and conduct Li+ ions between electrodes. In some embodiments the TF-SSE is a barrier film for water vapor and prevents moisture from diffusing to the anode electrode. The method includes providing a substrate; depositing a material including through one or more masks on the substrate. The deposition of such a film can be performed to control one or more electronic parameters. The films can be deposited with no open porosity to form a thin film layer with conductivity for Li+ ions on or adjacent to a high capacity cathode material to form a battery or capacitor with high capacity, high energy density and high cycle life. In some embodiments, the thin film can be a film with no grain boundaries or open porosity. In some embodiments the thin film is formed by DC sputtering of a conductive ceramic target with RF substrate bias to form an amorphous layer.

In some embodiments a anode current collector such as a copper or aluminum foil is passivated and smoothed or planarized with a film that is stable to Lithium metal such as the oxides and nitrides of Ca, Al, Be, Mg and Ti prior to deposition of the TF-SSE layer. In some embodiments the anode or anode current collector is passivated by a planarized layer of a metal nitride coating. Examples may contain $Mg_3Al_2$, NiAl, $MgZn_2$ and or $Mg_2Zn_3$, which when an anode structure is supersaturated with lithium, a layer of pure lithium is formed. (See, e.g. "Electrochemical Behavior of Intermetallic Compounds during Insertion/Dissolution of Lithium" G. Vladimir, Lee S. Mock and O. Viktoria, Samsung Advance Institute of Technology SAIT, Box 111 Suwon 440-600 Korea, Department of Electrochemistry, Rostov State University Zorge street, 7 Rostov-on-Don 344090 Russia, ISSN 1023-1935, Russian J. of Electrochem. 2007, V.43, no 12, pp 1398-1405, Pleiades, Ltd, 2007). Anodes containing one or more such films can be assembled in the presence of an electrolyte with a high capacity cathode to form a battery cell, as is further discussed below.

Figure 10A:
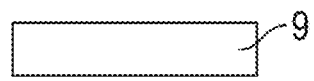
FIGS. 10A through 10H illustrate formation of an embodiment of a high capacity thin-film battery.

FIGS. 10A through 10H illustrate formation of an example HC-TFB according to some embodiments of the present invention. As shown in FIG. 10A, a substrate 9 is provided. Substrate 9 can be a carrier such as a silicon or ceramic wafer, a printed circuit board or flexible web, or other substrate. In some embodiments, substrate 9 can be, for example, a copper foil, for example with a 10 micron thickness and a surface roughness of 40 nm to 100 nm Ra.

Figure 10B:
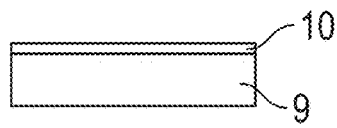

As shown in FIG. 10B, an anode layer 10 is then deposited on substrate 9. The anode layer 10 can be formed on substrate layer 9 by first depositing a layer of Ti followed by a planarizing TiN layer by reactive magnetron sputtering from a metallic Ti target with RF substrate bias. In some embodiments, the Ti layer can be 15-25 nm thickness while the TiN layer can be 250-500 nm thickness. The reactive magnetron sputtering can be accomplished with an RF substrate bias of 50-200 Watts adjusted for an example of a 300 mm diameter Cu anode foil substrate, which will provide a continuous, amorphous protective layer with a surface roughness less than that of the copper substrate, thereby covering and planarizing the Cu-foil surface roughness. Such a planarized anode layer 10, the TiN layer, can be a barrier to Li+ ions to protect substrate 9 but is electrically conductive.

Figure 10C:
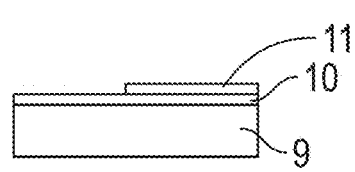

As shown in FIG. 10C, an anode collector film 11 is formed over a portion of the anode layer 10. Anode collector film 11 can be, for example, a layer of $Mg_3N_2$ from 10 nm to 50 nm in thickness reactively sputtered from a Mg metal target with RF bias. Anode collector film 11 deposited over the Ti/TiN film of anode layer 10 can protect the TiN from Li metal both below and above the temperature of Li melting, which is about 180° C.

Figure 10D:
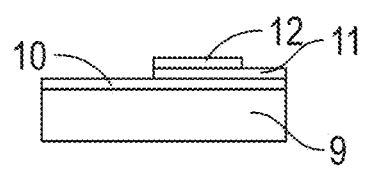

As shown in FIG. 10D an anode film 12, or intermetallic Li precursor layer, is provided over a portion of anode collector film 11. Anode film 12 can be formed by continuing the deposition from the Mg metal target with Argon to form a Mg layer. In some embodiments, other metals having an intermetallic compound with Li metal may be deposited. Anode film 12 can be, for example, 2 nm to 10 nm thick. Anode film 12 can perform nucleation and wetting for eventual formation of Li metal on the anode.

Figure 10E:
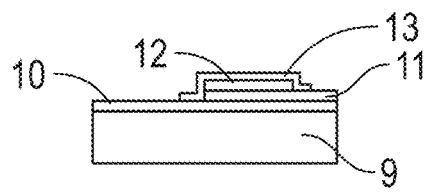

As shown in FIG. 10E, an electrolyte precursor layer 13 is formed. In some embodiments, precursor layer 13 can be an amorphous dielectric film. In some examples, precursor layer 13 can be formed of Zirconium Oxynitride deposited over the Mg Metal of anode film 12. Precursor layer 13 can be formed from 500 nm to 2000 nm or more in thickness to form a Li+ ion conductive solid state electrolyte (SSE) after activation. The Zirconium Oxynitride precursor layer 13 can be formed by biased pulsed DC reactive sputtering, for example.

Figure 10F:

FIG. 10F illustrates formation of a cathode by calendaring a layer of lithium metal oxide, for example 150 microns of Nickel Cobalt Manganese Oxide (NCM) to form a layer 14 on a metallic layer 15. The NCM can be in the liquid state during calendering to a thickness. The metallic layer 15 can be, for example, a 10 micron Al foil. Drying of the liquid NCM can be accomplished to form an up to 30% porous solid.

Figure 10G:
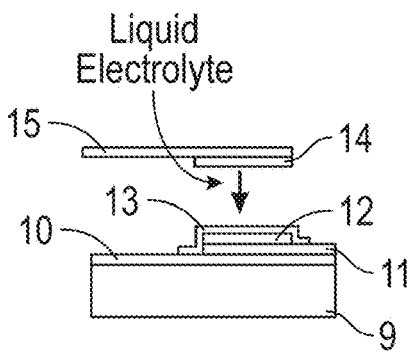
Figure 10H:
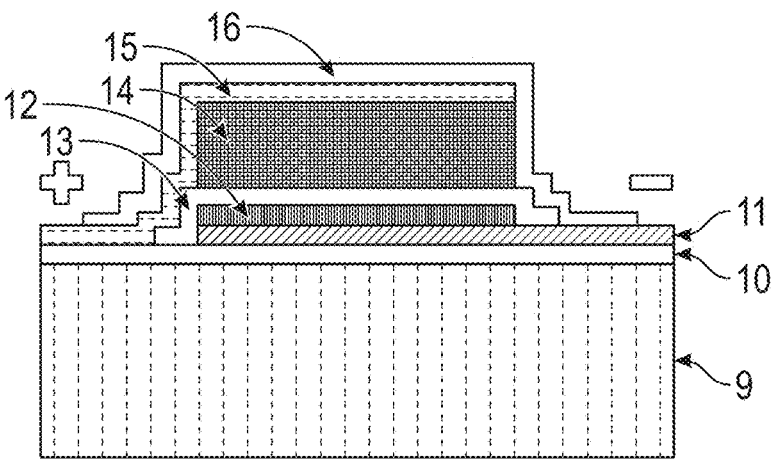

As shown in FIG. 10G, the cathode formed by NCM layer 14 and metallic layer 15 is assembled in a package with liquid electrolyte, which fills the porosity of the NCM layer 14 and provides conductivity between NMC layer 14 and precursor layer 13. As shown in FIG. 10H, the initial battery structure is completed by addition packaging layer 16. As is further illustrated in FIG. 10H, electrical connections can be provided to layer 11 and layer 15 in order to charge and discharge the battery cell that has been formed. FIG. 10H illustrates formation of a single battery cell, otherwise known as a "single layer" cell. Multiple layer cells having higher energy density may be formed with similar structure.

Although FIGS. 10A through 10H illustrate formation of a battery structure by deposition of sputtered thin films on an anode, in some embodiments the thin film may be formed on the cathode instead. In which case, the high capacity anode structure can be formed in other ways. Further, thin films may be deposited both on the cathode layer and on the anode layer prior to assembly. Furthermore, although this example illustrate a Li+ ion battery, a battery device according to some embodiments may also use Na+, Zn++, Al+++ or other metal ions.

Figures 21A, 21B, 21C, 21D:
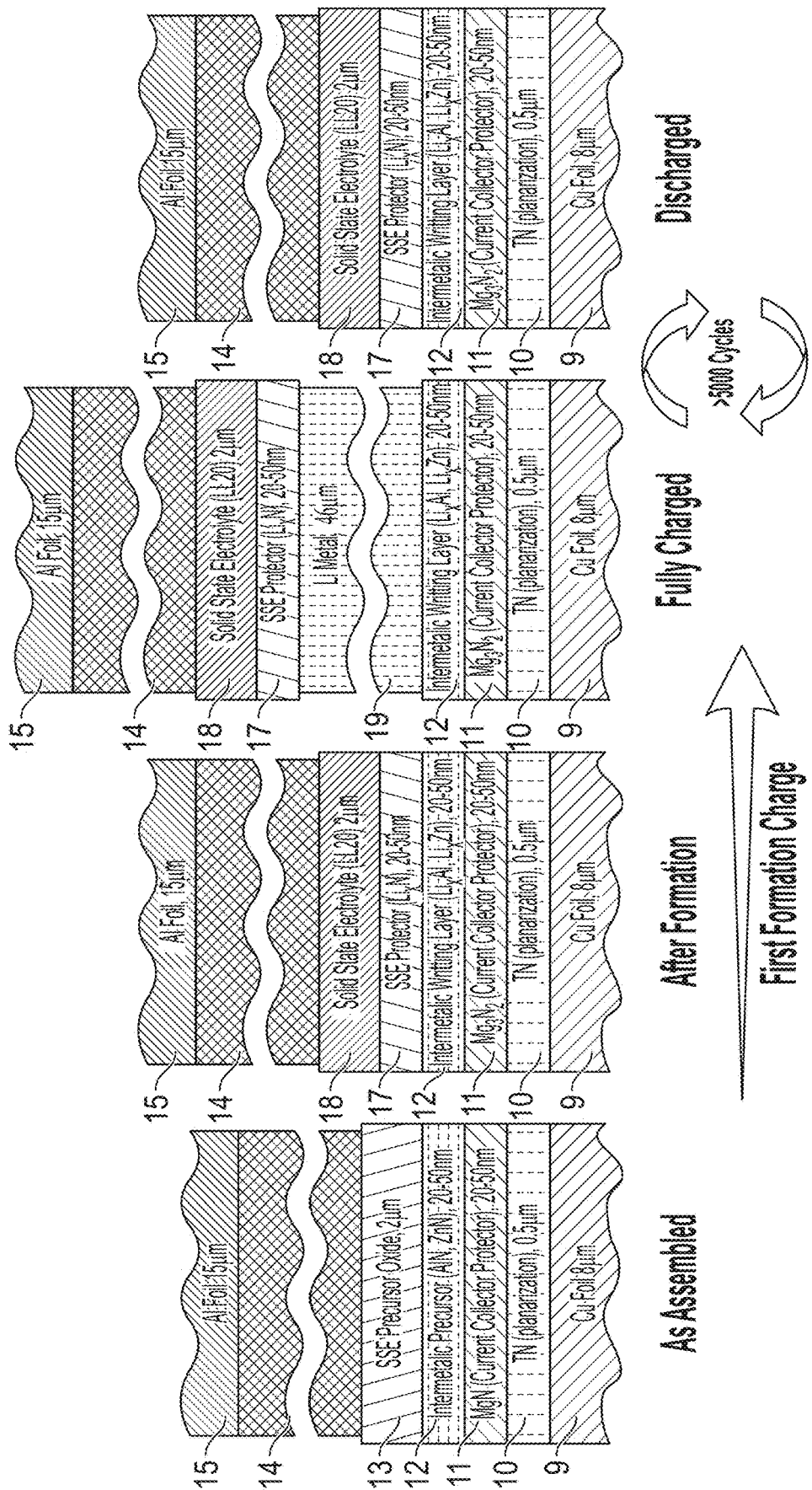
FIGS. 21A, 21B, 21C and 21D schematically illustrate a principle of operation for an embodiment of the present invention.

FIGS. 21A through 21D illustrate activation and operation of a structure as illustrated in FIG. 10H to form a functional battery cell. As illustrated in FIG. 21A, the activation and operation process starts with the structure formed in FIG. 10H. FIG. 21B illustrates a lithiation process where a charge is placed across the structure. The charging process provides mobility of the Li+ ions from layer 14 into layers 13 to form an SSE layer 18 and a SSE protection layer 17 from the original precursor layer 13. The lithiation process illustrated in FIG. 21B completes the formation of the battery cell.

FIGS. 21C and 21D illustrate charge and discharge states of the battery cell, which may be operated for a large number of battery cycles as is further discussed below. FIG. 21C illustrates a charged state of the battery structure, where a Li metal layer 19 is formed between the SSE layer 17 and layer 12. In the discharge state, as illustrated in FIG. 21D, the Lithium metal has diffused back into the cathode structure to return to the discharged state illustrated in FIG. 21B.

FIG. 4 is a table that compares projections of gravimetric and volumetric capacity for a 6.6 Ah battery cells with a 152 micron thick, 10 cm×12.5 cm Nickel Cobalt Manganese Oxide (NCM) high capacity cathode. These cells are projected to have a conductive porosity of ~38%. As thin film layers are utilized with micron and submicron thickness the energy capacity is projected to increase as much as about 50% over currently proposed bulk batteries (e.g. the composite electrolyte 1 and composite electrolyte 2 batteries) having the same high capacity cathode.

The energy density projected for the composite electrolyte battery 1 is shown in FIG. 4. As illustrated in FIG. 4, a 152 micron layer of NCM is calendered on a cathode foil. A TF-SSE separator is deposited on an anode foil. As is shown, projections for composite electrolyte 1 with a composite separator of 30 microns thickness compares well with the ARPAe IONICs goal of ~1000 Wh/l. Composite electrolyte batteries 1 and 2 with 30 and 15 micron separates represent an increase of 19% and 29% respectively over the ARPAe goal, however with potentially reduced reliability and yield as discussed above and may result in catastrophic combustive failure in operation.

HC-TFB1 through HC-TFB4 are projections for battery cells as illustrated in FIGS. 10A through 10H and further discussed with FIGS. 21A through 21D. Substitution of a thin film electrolyte, as illustrated in HC-TFB1 through HC-TFB4, according to embodiments of the present invention, represents an increase of 39% in energy density. With a 2 micron thick TF-SSE as illustrated with HC-TFB2, a potential 48% improvement is projected. HC-TFB3 and HC-TFB4 provide further reductions of the TF-SSE thickness and result in improvement to 50% and 51%. The reduction in the thin film thickness to a micron or less is projected to be an important factor for overall reduction of cost of manufacture and performance of the battery cells.

The structure illustrated in FIGS. 10A through 10H and FIGS. 21A through 21D is an example of battery or capacitor structures according to some embodiments of the present invention. However, other structures according to some embodiments can be formed and other materials may be used. Other examples, along with further discussion of these examples, are provided below.

Figure 5:
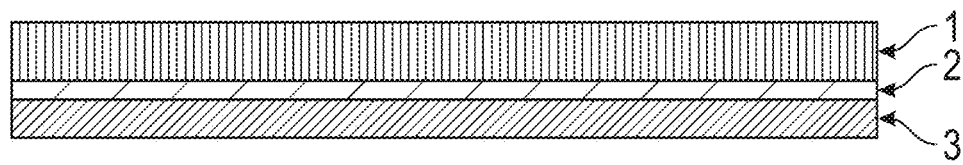
FIG. 5 shows the layer structure of a single-sided anode/electrolyte stack.
Figure 6:
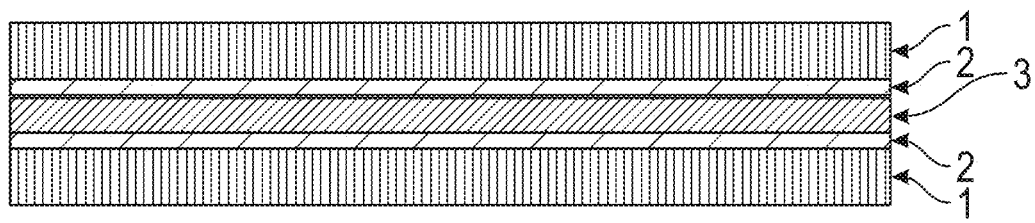
FIG. 6 shows layers of a double-sided anode separator stack.

FIG. 5 shows the layer structure of a single-sided anode/electrolyte where layer 1 can be a TF-SSE such as TF-SSE layer 13 in FIG. 10H. Layer 2 can be a barrier layer such as Ti/TiN layer 10 illustrated in FIG. 10H. Layer 3 can be a substrate foil such as layer 9 illustrated in FIG. 10H. When assembled with a cathode, the structure illustrated in FIG. 5 forms a single cell with a single anode foil. FIG. 6 shows layers of a double-sided anode separator stack where each side of a single anode conductor contains an electrolyte layer 1. When assembled with a cathode on either side, a double layer cell can be formed with a single anode foil.

Figure 7:
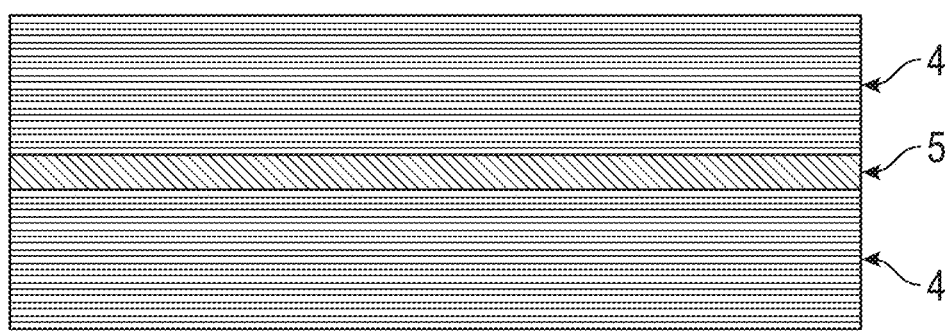
FIG. 7 shows a double-sided cathode structure.

FIG. 7 shows a double-sided cathode structure, Layer 4 is a cathode, layer such as NCM layer 14. Layer 5 is a current collector such as layer 15 of FIG. 10H. When a double-sided as illustrated in FIG. 7 is combined with the double side anode structure of FIG. 6, any number of double-sided cells can be formed as terminated by single layer anodes or cathodes assembled to the outside. The higher number of cells can increase the energy storage at lower volume of material for the final structure. Thus, for a given capacity, the volume may be reduced significantly, as shown in FIG. 8 with a full cell stack.

Figure 8:
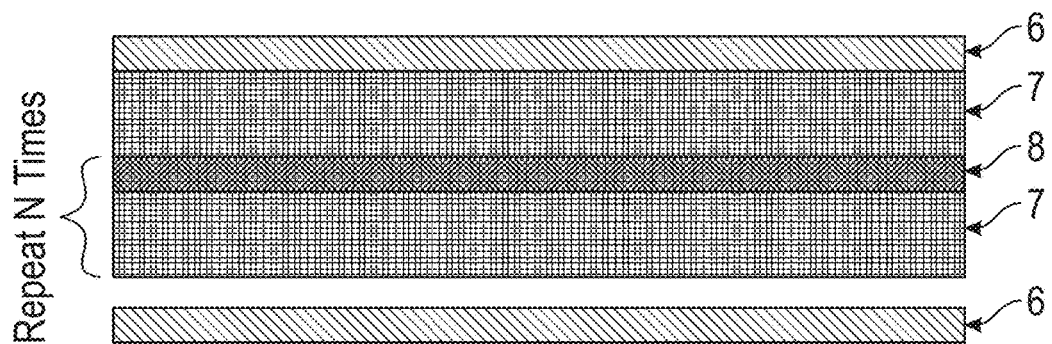
FIG. 8 shows a cell stack.

FIG. 8 shows a cell stack; 6 is a single sided anode separator stack, 7 is a double-sided cathode electrode and 8 is a double-sided anode-separator stack. Layer 8 is a double-sided anode as shown in FIG. 6 while layer 7 is a double-sided cathode as shown in FIG. 7. Layer 6 is a single-sided electrode that terminates the double-sided structures of layers 7 and 8. Successive layers can be formed with different areas of electrodes. For example, larger area electrodes will have high capacity and lower area resistance per layer. Cell areas as well as the number of layers in the cell, along with the connections between cells, can be varied to form a multi-cell battery with particular performance characteristics.

Figure 9:
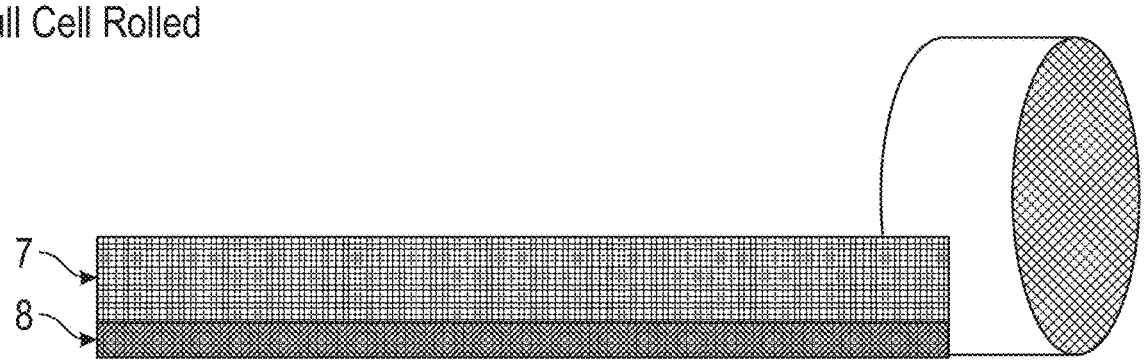
FIG. 9 shows a full cell roll.

FIG. 9 shows a full cell rolled where layer 7 is a double-sided cathode electrode and layer 8 is a double-sided anode-separator stack which can be rolled into a cylindrical structure or cut and stacked as individual cell structures. In some embodiments, single layer electrodes can be used.

Embodiments of the present invention include energy storage devices, together with methods of manufacturing a device that contain at least one continuous, defect free thin solid inorganic film. In other words, looking at the structure of FIG. 21H, the SSE precursor layer 13 or another layer is a continuous defect free thin solid inorganic film. According to some embodiments such a film is a structural or stress bearing film and remains intact as a discrete defect free layer through the strain of manufacture and cycle operation of a battery having a bulk or composite cathode. In some embodiments, a single layer thin film can have a compressive stress as deposited as high as 200-300 MPa so as to be durable to tensile strain for a film having a thickness in the micron or sub-micron range and undergoing a tensile strain release of up to 3% upon formation of a Li metal during the charge/discharge cycle. In some embodiments it is a TF-SSE layer, such as layer 13, that provides a barrier to both moisture and electrical current and is a conductor for Lithium ions.

A bulk Li+ ion capacity cathode can be formed of inorganic compounds containing Li+ ions, which may also contain carbon and polymer materials so as to be adhesive and conductive to Li+ ions, with a thickness from the micron to the millimeter scale. The bulk cathode can be coated by sputtering a TF-SSE layer or joined with a TF-SSE layer deposited on a conductive layer according to some embodiments of the present invention to form a high capacity thin film battery (HC-TFB) cell or high capacity thin film capacitor (HC-TFC) for the storage and dispatch of electrical energy.

Some embodiments of an energy storage device can include a continuous TF-SSE layer deposited in vacuum by high rate DC magnetron sputtering from a conductive sputter target. In some embodiments, a TF-SSE layer can be sputtered directly onto a bulk cathode. In some embodiments a TF-SSE layer can be sputtered on an anode current collector which is joined with a bulk cathode, each anode capable of conveying electrical current between the electrodes and Li+ ions across the TF-SSE layer in both a charging and a discharging condition so as to provide a HC-TFB or a high capacity thin film capacitor (HC-TFC).

In some embodiments a HC-TFB or HC-TFC includes a thin film formed of a material suitable to act as an anode current collector stable to Lithium metal. In some embodiments, such a layer will form $Li_3N$ between the TF-SSE and lithium metal, which is formed as a result of charging the device as demonstrate FIGS. 21C and 21D.

A TF_SSE layer according to some embodiments of the present invention can be defect free when it is fully dense. The layer is "defect free" in this description when the layer has less than 1 through-hole pinhole or columnar through-film pore per device unit area. For a 1 cm square device this would be less than 1 per centimeter. For a 10×10 cm square device it would be less than 1 defect per 100 cm square area as tested. A high modulus of elasticity TF-SSE layer can be determined to be defect free with respect to failure and with respect to electrical insulation of the electrodes when tested for capacitance. Some TF-SSEs possess compressive stress characteristic so as to provide a structural or stress bearing film with fracture toughness to resist mechanical forces exerting strain upon the film during the charge/discharge cycle. This characteristic accompanies both the processes of manufacture and the charge and discharge operation of the battery and can consequently be defect free with respect to fracture failure from cracking or buckling and delamination failure. A TF-SSE layer can be defect free with respect to water vapor permeation rate (WVPR) when the WVPR is at or below the MOCON detection limit of about 5 E-3 gr-m$^{-2}$day$^{-1}$ under damp heat condition of 80° C. and 60% RH. Such a TF-SSE can be utilized with hydrous and anhydrous cathode layers to provide high charge/discharge capacity, high conductivity, and high cycle life despite moisture content of the cathode layer.

Some embodiments include a TF-SSE layer sputtered from a conductive ceramic target or targets by reactive sputtering wherein a direct current (DC) or pulsed DC current may include voltage durations at the sputter target that are negative, positive and or make transitions between negative and positive to sputter a thin film layer.

In some embodiments an RF plasma is formed by an RF power supply capacitively connected to the substrate to be coated so as to provide ion bombardment of the film as it is being sputter coated, which ion bombardment forms a layer free of open porosity (i.e. is fully dense). Such a film may be defect and or pinhole free so as to prevent transport of water or electrical current. A film deposited by BPDC can be a planarized film and forms a fullly dense and essentially amorphous or glassy layer having a smoother surface than the layer on which it is formed. In some examples an amorphous film may be made to have a crystalline or micro-crystalline aspect between an initial amorphous aspect as is shown in FIG. 11

Figure 11:
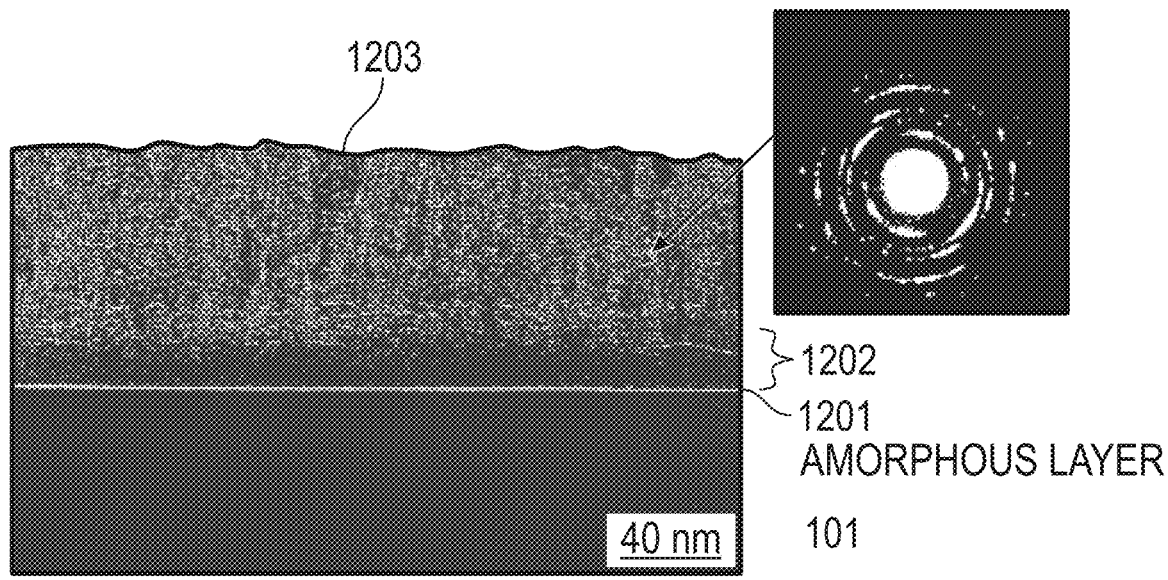
FIG. 11 shows the morphology of a film of titanium oxide having an amorphous portion followed by a microcrystalline portion deposited by biased-pulsed DC reactive sputtering.

FIG. 11 shows the morphology of a film of titanium oxide having an amorphous portion (1202) of about 25 nm thickness followed by a microcrystalline portion (1203) of about 400 nm thick TiO2 deposited by BPDC reactive sputtering. Both portions are fully dense but the amorphous portion presents no grain boundaries to the layer (1201) upon which it is deposited.

Some embodiments include free standing HC-TFB battery stacks or multiple such stacks. Batteries may be built up or placed on functional substrates such as printed circuit boards, inter-leaver boards or be included as an element of a functional circuit. Batteries may further be included on a semiconductor substrate, including silicon or other semiconducting substrates, or as an element of an integrated device.

Some embodiments include a metal foil substrate or other conducting layer, as well as those having one or more deposited thin film metallic conducting layers. In some embodiments the thin film layer may be deposited on a single individual substrate or on a continuous sheet or roll of substrate including, but not limited to, wide area substrates up to many meters wide by many meters long.

As discussed above, embodiments of the present invention can include energy storage devices together with methods of manufacturing an energy storage device which contains at least one thin solid inorganic film. Such a film is a structural or stress bearing film and remains intact as a layer through the strain of manufacture and cycle operation of a battery. In some embodiments, a single layer thin film has a compressive stress as deposited so as to be durable to tensile strain for a film having a thickness in the micron or sub-micron range.

A method of producing such a layer includes providing a substrate; depositing at least one material layer through one or more masks on the substrate; and during deposition controlling one or more electronic parameters through thickness in one or more films to form a low area specific resistivity (ASR) TF-SSE layer of an energy storage device with both high energy density and high cycle life. In some embodiment a TF-SSE or other layer can be deposited by DC sputtering from a conductive target.

Embodiments of the present invention include a TF-SSE comprised of a high Li+ ion conductivity material system may include oxide, sulfide, phosphide and halogen containing compounds containing Lithium ions. These include Lithium Lanthanum Titanate (Perovskites), e.g. (LLT) La0.5 Li0.5 TiO3 and Garnets such as (LLZ) Li7 La3Zr2O12 known to have conductivity in the range E-3 to E-5 S/cm at room temperature. TF-SSEs comprised of many of the metal oxides are moisture stable barrier materials. Inorganic materials suitable to form a TF-SSE can be formed into conductive ceramic alloy targets for high rate, low cost DC magnetron sputtering onto single substrates or continuous, roll to roll metal of polymer web with high adhesion and fracture toughness. According to some aspects of embodiments of the present invention a TF-SSE containing high capacity battery or capacitor will be highly embeddable; temperature, fire and chemically safe, and be stabile to both Li+ and Li metal. It will also provide an oxide moisture barrier film.

Figure 2A:
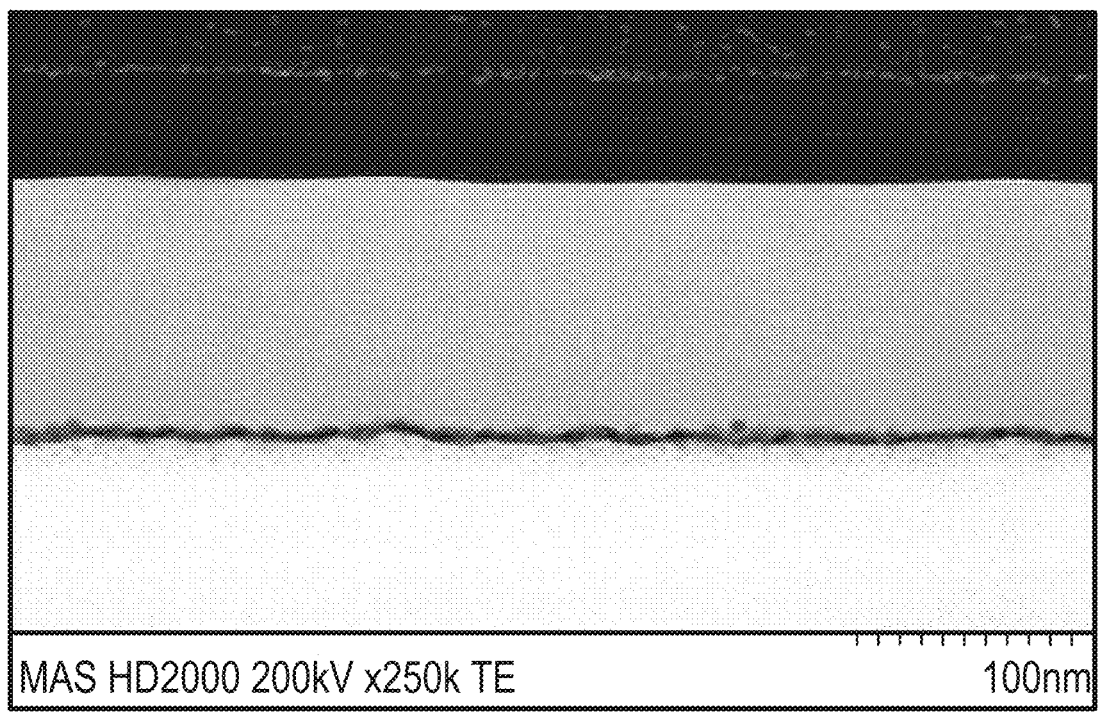
FIG. 2A shows a TEM cross section of an amorphous, biased pulsed DC (BPDC) deposited aluminosilicate film on a substrate.
Figure 2B:
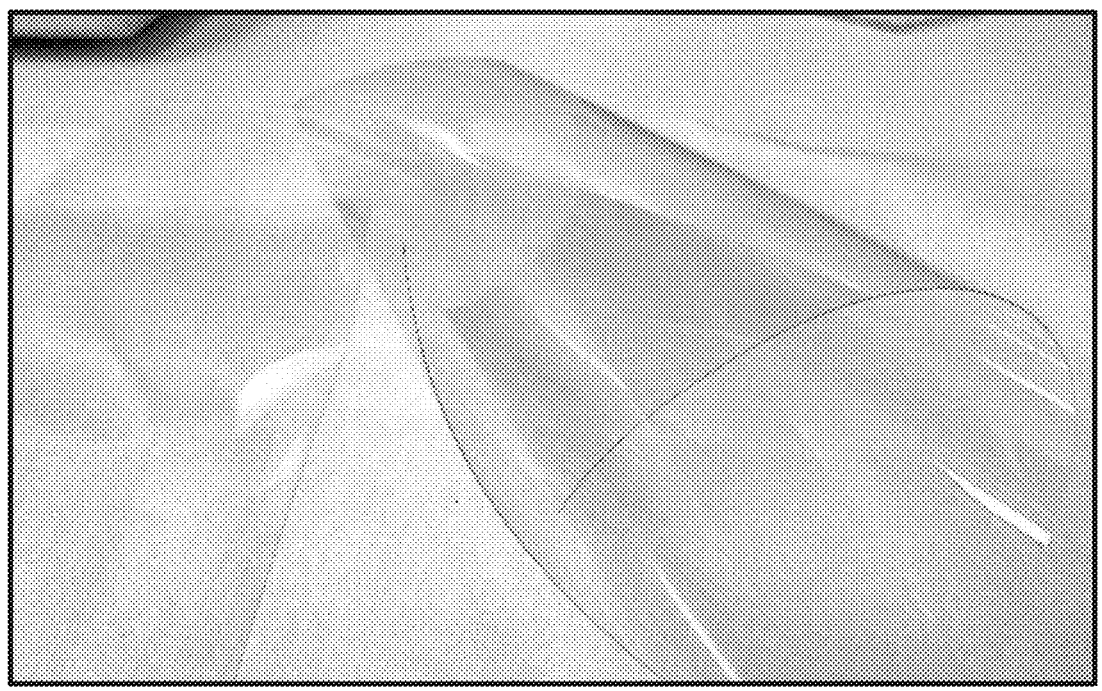
FIG. 2B shows the film illustrated in FIG. 2A after immersion in boiling water for 1 hr.
Figure 12:
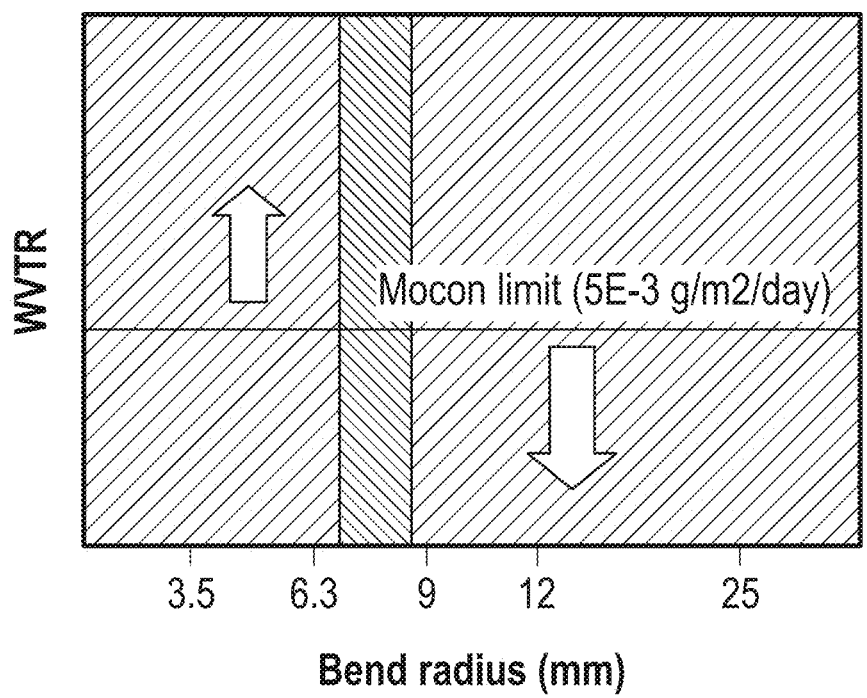
FIG. 12 shows a graph of water vapor transmission rate of the aluminosilicate film illustrated in FIGS. 2A and 2B measured by MOCON after mechanical bending.

It has further been demonstrated that films deposited according to a BPDC process form moisture barrier layers. FIG. 2A shows a BPDC oxide barrier layer deposited on a 1 ft. sq sample of DuPont Teijin PEN film after a boiling water test. The Aluminosilicate film illustrated in FIG. 2A was deposited with BPDC sputtering over about 10 nm of Iridium metal and tested for barrier performance in boiling water. FIG. 2A shows an SEM cross section of the about 150 nm 92/8 Aluminosilicate (92-8 atomic % Al Oxide) barrier film and indium after the test with no delamination or oxidation of the Indium metal. This film was independently tested and measured less than 1 E-6 gr-m$^{-2}$day$^{-1}$ water vapor permeation rate (WVPR) in damp heat on polyethylene nitrile (PEN) as shown in FIGS. 2A and 2B. The data is shown in FIG. 12. Flexural tests found the barrier coated PEN could be rolled to a radius of 12 mm up to 1000 times without cracking or edge damage. Results of the boiling water test are shown in FIG. 12. As shown in FIG. 2B, the test was performed without delamination, peeling or forming oxidation.

FIG. 12 shows a graph of water vapor transmission rate of the 92/8 aluminosilicate film shown in FIGS. 2A and 2B, which was measured by MOCON after mechanical bending to a radius down to 9 mm (~1.7%) bend to radius strain. The water vapor permeation rate (WVTR) was measured to be below the MOCON detection threshold of ~5E-3 gr-m-2day-1 was found both before and after the strain cycle.

Some embodiments of battery according to the present invention may include a cathode layer of Lithium cobalt oxide (LiCoO$_2$), Lithium nickel oxide (LiNiO$_2$), lithium manganese oxide (LiMn$_2$O$_4$), lithium nickel manganese oxide (LiNi$_x$Mn$_{1-x}$O$_2$), Lithium Nickel Cobalt Aluminium Oxide (LiNi$_x$Co$_y$Al$_z$O$_2$), Lithium Nickel Cobalt Manganese Oxide (LiNi$_x$Co$_y$Mn$_z$O$_2$), Lithium iron phosphate (LiFePO$_4$), Lithium manganese phosphate (LiMnPO$_4$), Lithium cobalt phosphate (LiCoPO$_4$), Lithium nickel phosphate (LiNiPO$_4$), Lithium metal silicates; (Li$_2$MSiO$_4$ wherein M is divalent cation such as Fe$^{2+}$, Mn$^{2+}$, and Co$^{2+}$ or a combination of these), non-stoichiometric combinations of the compounds above, and solid solutions of the above compounds. Some cathodes include an electrolyte filling pores inside lithium ion containing material in the positive electrode is selected from the list comprising aqueous electrolyte, organic electrolyte, ionic liquid electrolyte, polymeric electrolyte, and wherein the electrolyte is liquid, gel or solid.

The lithium metal anode is currently confounded by nodular and filament formation of lithium metal that forms at the anode and in some cases is lost to the battery circuit, sometimes referred to as "plated out", reducing the battery capacity. Lithium metal would be the optimal choice as an anode material, because it has the highest specific capacity (3,860 mAh g$^{-1}$) and the lowest anode potential of all.

As it is well known that Li will form an oxide preferentially in the presence of all other metal oxides including those associated with high Li+ ion conductive solid electrolytes except Be, Ca and Mg, which have a larger negative change in the Gibbs free energy of formation per equivalent mole of $O_2$, In order to stabilize Li metal against oxidation by the oxide of an adjacent layer, It is an aspect of embodiments of the present invention that a layer of oxide or nitride of Be, Ca or Mg are deposited on an anode current collector such as Cu or the anode side of a TF-SSE where Li metal undergoes reduction formation in the anode. An anode current collector such as Cu or other foil can be planarized and or coated according to some embodiments.

Some embodiments of the present invention include a battery or a capacitor and contain a thin film solid state electrolyte (TF-SSE) comprised of a high Li+ ion conductivity material system including oxide, nitride, sulfide, phosphide and halogen containing films. Said TF-SSEs includes Lithium Lanthanum Oxide Perovskites, e.g. (LLT) $La_{0.5}Li_{0.5}TiO_3$ and Garnets (LLZ) $Li_7La_3Zr_2O_{12}$. These oxide types are known to have conductivity of up to approximately E-3 S/cm in the crystalline state and about E-4 S/cm in the amorphous state. TF-SSEs comprised of these dielectrics that are sputtered by BPDC reactive magnetron sputtering can be fully dense and are therefore moisture and lithium metal barriers. They are earth abundant and can be formed into conductive ceramic alloy targets.

In some embodiments, an electrode can be comprised of Aluminum foil, coated with a continuous coating of copper upon which an anode layer and or a TF-SSE is deposited by sputtering. In some embodiments, an anode can be formed of a metal film deposited to passivate Cu from it's solubility for Li metal, which is otherwise about 2 atomic % or less. Deposition of Mg, Al, Zr or other metal or metal nitrides are deposited to decrease the solubility of Cu to Li metal as an element of a current collector for Li metal. In some embodiments a layer of $Li_3N$ is deposited on the anode current collector prior to the deposition of the TF-SSE. In some embodiments a metallic film of Li is deposited between the TF-SSE and a Cu portion of the anode upon charging of the battery. In some embodiments the Cu surface of an anode is planarized by use of BPDC coating of a material on a Cu element of an anode including Cu or metal nitride so as to improve the surface roughness. A surface for deposition of a TF-SSE may include a TF-SSE thickness on the order of about 1.5 to 3 times the rms roughness to form a continuous film without through film defects caused by protruding asperities of the substrate.

In some embodiments, a high capacity lithium or lithium-ion cell can be formed on a silicon wafers or circuit board or interposer circuit substrate. FIG. 10H, for example, illustrates such a structure where a thin copper film is sputtered onto a silicon wafer and patterned to form an electrode and connections. A layer 10 of Ti/TiN and/or a layer 11 $Mg_3N_2$ is sputtered on top of the copper film formed as part of layer 9. This is followed by a micron or sub-micron TF-SSE layer 13. In some embodiments, a cathode, produce by coating a foil (layer 15) with a slurry (layer 14) layer comprised of lithium containing metal oxide powders, iron phosphate or other cathode material, mixed with small amounts of binding and conductive additives and solvent, coating the slurry onto foils and driving off the solvent through drying the cathode (layers 14 and 15). The completed cathode may be infiltrated with a liquid, gel or solid-state electrolyte to fill its porosity before cutting into individual segments. The singulated cathode foils transported to the anode/SSE region on the wafer and are positioned so as not to extend beyond the TF-SSE region 13. In some embodiments the cathode layer is connected to an interconnect metal layer. In some embodiments the assembled layers are encapsulated by sputtering an impervious inorganic top cover or barrier layer 16 according to some embodiments of the invention comprised of an oxide or nitride such as SiO2 or Si3N4 or other metal oxide alloy.

For integrating the cathode for formation of small batteries onto silicon chips, after coating or calendaring a cathode material onto a foil, the cathode may have an encapsulate layer 16 sputtered over, which provides the benefit of sealing the cathode, protecting it from air or moisture egress or exit, while providing an adhesive or structural surface. Such a cathode can be cut into individual segments and put onto tape or chip carriers for transport to and transfer to the selected TF-SSE coated region. The cathode material is placed on the TF-SSE region so as not to extend to the edge of said region as shown in FIG. 10H. The cathode material is made adherent to the TF-SSE region with pressure, heat or radiation exposure for curing. Interconnect of the cathode electrode can be by means of a patterned dielectric and a deposited metallic interconnect layer, wire bonding or by use of through silicon vias.

Previous work has focused on the formation of dense transparent and in some embodiments defect free films. Deposition of amorphous and/or planarized insulating dielectric thin films which as-deposited does not contain lithium has not previously been used in thin-film solid state batteries. Furthermore, lithium-containing thin films have not previously been used in a battery which is assembled with a separate high-capacity bulk cathode such as that described here.

As such, the following U.S. Patents and Publications provide background for certain embodiments as presented in this disclosure. Preparation of targets is described in U.S. patent publication 2003/0175142, entitled "Rare-Earth Pre-Alloyed PVD Targets for Dielectric Planar Applications," (now abandoned); U.S. Pat. No. 6,533,907 entitled "Method of Producing Amorphous Silicon;" U.S. Pat. No. 6,506,289 entitled "Planar Optical Devices and Methods For Their Manufacture;" U.S. Pat. No. 6,827,826 entitled "Planar Optical Devices and Methods;" U.S. Pat. No. 6,884,327 entitled "Mode Size Converter for Planar Waveguide;" U.S. Pat. No. 7,205,662 entitled "Dielectric Barrier Films;" U.S. Pat. No. 7,238,628 B2 and U.S. Pat. No. 8,076,005 B2 entitled "Energy Conversion and Storage Films and Devices by Physical Vapor Deposition of Titanium and Titanium Oxides and Sub-Oxides;" U.S. Pat. No. 7,205,662 entitled "Dielectric Barrier Layer Films;" U.S. Pat. No. 7,262,131 entitled "Dielectric Barrier Layer Films;" U.S. Pat. No. 7,378,356 entitled "Biased Pulse DC Reactive Sputter of Oxide Films;" U.S. Pat. No. 7,381,657 entitled "Biased Pulse DC Reactive Sputtering . . . ;" U.S. Pat. No. 7,413,998 entitled "Biased Pulse DC Reactive Sputtering . . . ;" U.S. Pat. No. 7,469,558 entitled "As-deposited planar optical waveguides;" U.S. Pat. No. 7,544,276 entitled "Biased Pulsed DC Reactive sputtering . . . ;" U.S. Pat. No. 7,826,702 entitled "Optical Coupling into Highly Uniform Waveguides;" U.S. Pat. No. 7,838,133 entitled "Deposition of Perovskite and Other Compound Ceramic Films for Dielectric Applications;" U.S. Pat. No. 8,045,832 entitled "Mode Size Converter;" U.S. Pat. No. 8,076,005 entitled "Energy Conversion and Storage Films;" U.S. Pat. No. 8,105,466 entitled "Biased Pulse DC Reactive Sputtering;" and US 20140140659 entitled "Adiabatic Planar Waveguide Coupler Transformer," each of which are herein incorporated by reference in their entirety. Additionally, application of RF biased RF reactive sputtering of LiPON and LiCoO2 has been described in U.S. Pat. No. 8,636,876, "Deposition of LiCoO2." One skilled in the art will recognize that Li incorporated in the sputter cathodes, such as that used to produce Li batteries according to U.S. Pat. No. 8,636,876, results in the Li being present during magnetron sputtering. One of skill in the art will also recognize the lithium interacts with the plasma formed by both the sputtering magnetron discharge and the RF bias discharge induced capacitively and simultaneously at the substrate to be coated. The presence of lithium metal vapor in such discharges causes arcing and contamination of the reactor, causing damage, discoloration, cracking and particles that contaminated the substrate. These defects can drastically limit both the power and rate of deposition that can be achieved prior to requiring constant stoppage and maintenance of the target, chamber shields, and vacuum side components that put an end to production. Consequently, the systems according to U.S. Pat. No. 8,636,876 require constant renewing and cleaning of the vacuum system frequent replacement of the sputter targets to prevent reduction of the yield of good battery cells. Although good cells have been made, it is well known that the problems and costs encountered in manufacturing is detrimental to effective application of systems as described in U.S. Pat. No. 8,636,866 to production of Li-ion batteries.

However, a thin film solid state lithium metal battery according to the present disclosure utilizes lithium free materials and sputter targets for thin film deposition. Moreover, in accordance with embodiments of the present disclosure, precursor layers such as anode protective layers, precursor intermetallic layers, and precursor solid-state electrode (SSE) layers are manufactured by lithium free sputtering methods. Such devices are then lithiated to form solid-electrolyte interface (SEI), SSE and intermetallic layers with lithium from the cathode during formation outside of a vacuum. The sputtering process as described in the patents and applications recited above utilizes pulsed DC reactive sputtering, which provides a high rate sputtering process in comparison with the RF sputtering process utilized historically for deposition of lithium containing UPON SSE. Together with RF bias on the substrate to be coated, pulsed DC deposition processes, as described in those references cited above, can provide an amorphous and planarized dielectric film having no grain boundaries and having high levels of adhesion and compressive stress, factors that after lithiation as described in this disclosure provide for high conductivity through and between films.

Figure 3:
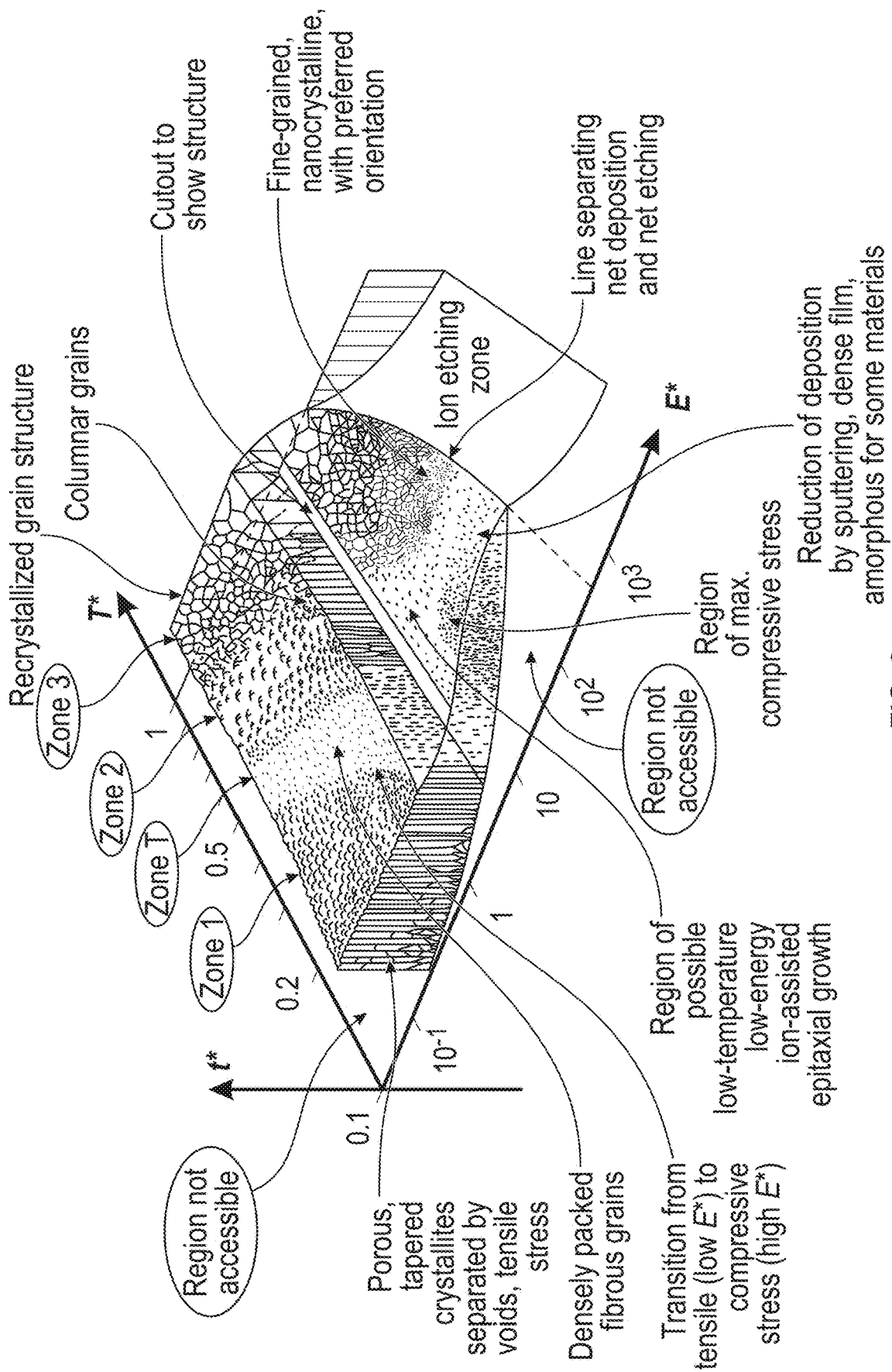
FIG. 3 shows a Thin Film morphology diagram showing the zones of morphology due to physical vapor deposition process conditions of temperature and ion energy.

FIG. 3 shows process condition for the formation of a amorphous, planarized vacuum thin film. This Thin Film morphology diagram was first published by B. A. Movchan and A. V. Demchishin, (B. A. Movchan, A. V. Demchishin, Fizika Metallov i Metallovedenie (Physics of Metals and Metallography) 28 (1969) 653 Paton Inst. Elec. Welding, Kiev USSR) shows the zones of morphology due to biased sputtering. Optimum fully dense amorphous films are found in zone T at 0.2-0.3 of the temperature of melting and about 100 eV ion RF bias. Planarization of amorphous films takes place between about 0.2 to 0.3 Tm and between about 10-100 eV ion energy where the rate of deposition is greater than the rate of ion induced etching.

Figure 13:
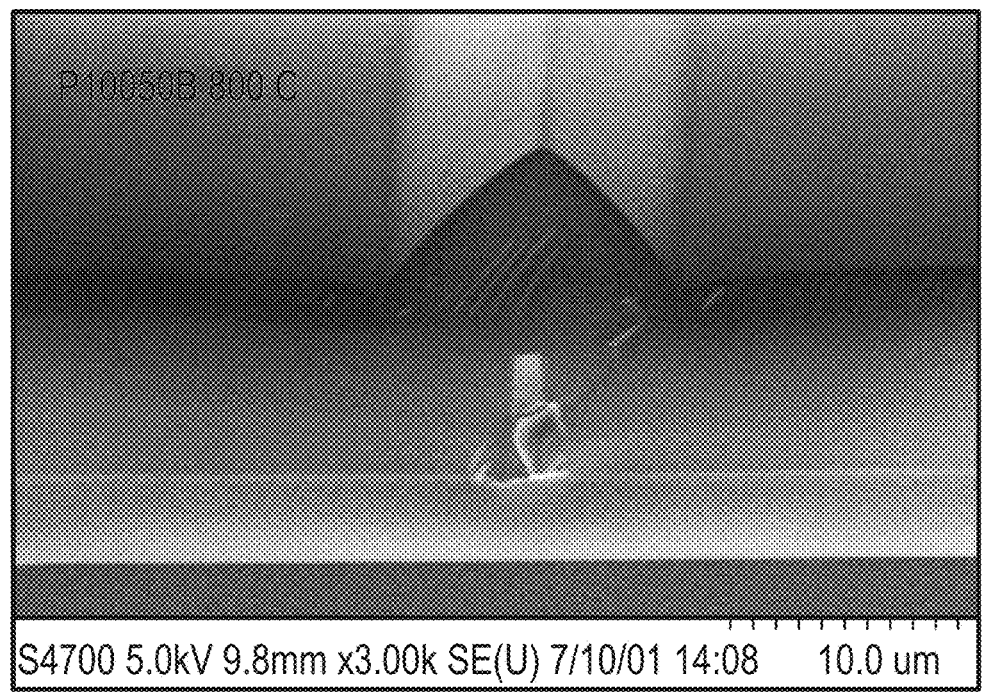
FIG. 13 is an SEM that shows Planarization of a 1 micron wide×8 micron tall ridge of patterned SiO2.

FIG. 13 shows an SEM illustrating Planarization of a 1 micron wide×8 micron tall ridge of patterned SiO2 by an about 12 micron thick layer of BPDC reactively deposited 92/8 (92 atomic % Si by 8 atomic % Al) aluminosilicate film. An 8 micron tall asperity can be covered by a continuous amorphous layer having a film thickness about 1.5×the height of the asperity. Note the angle of the triangular structure over the ridge below and the smooth surface of the planarized film.

Figure 14:
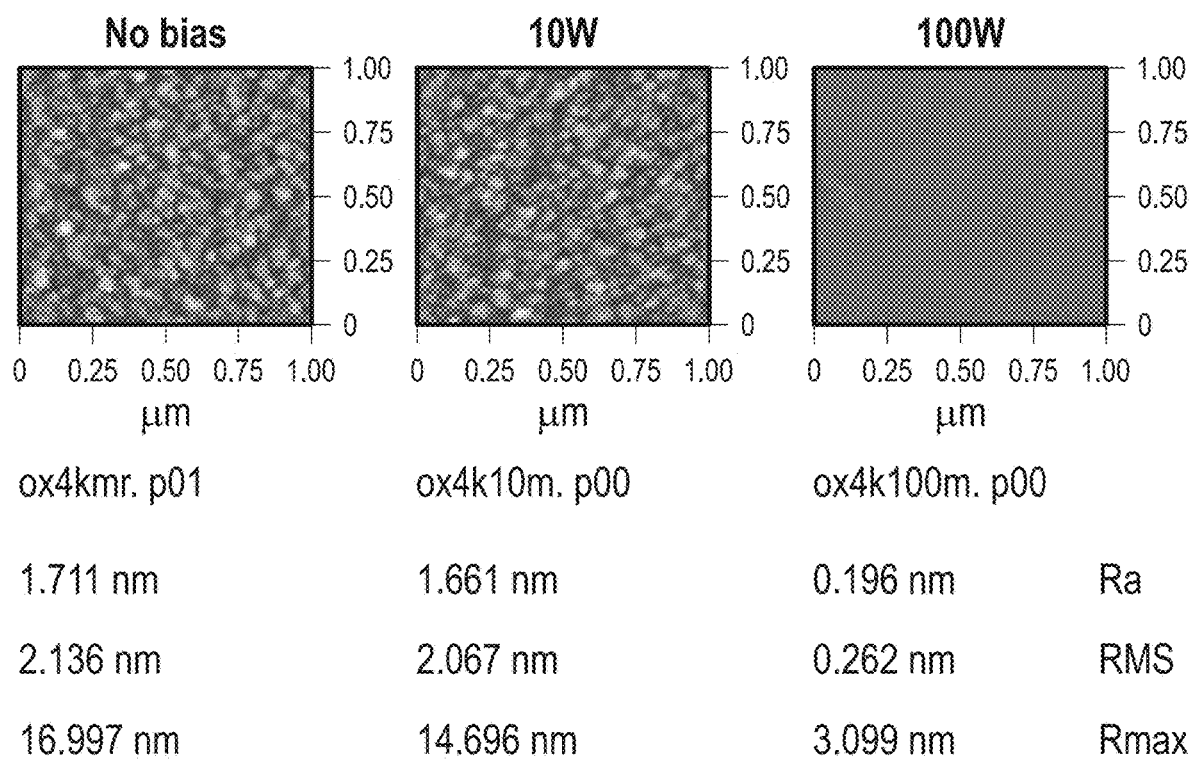
FIG. 14 shows Planarization of a 250 nm SiO2 film deposited with BPDC.

FIG. 14 shows Planarization of a 250 nm SiO2 film deposited with BPDC. An atomic-force microscopic (AFM) roughness scan of 250 nm SiO2 films deposited by BPDC shows the effect of the RF bias power at 13.56 MHz on the film morphology deposited on a 250×250 mm substrate. The no bias film shows a roughness of 2.136 nm rms and 16.997 rmax. The addition of 10 Watts RF bias power decreases the roughness to 2.067 nm rms and 14.696 nm rmax. Further increase to 100 W RF bias decreases the roughness to 0.262 rms, essentially an atomic scale smooth film and 3.099 nm rmax which demonstrates local planarization of the surface while the columnar structure is eliminated and the film is fully densified.

Figure 15:
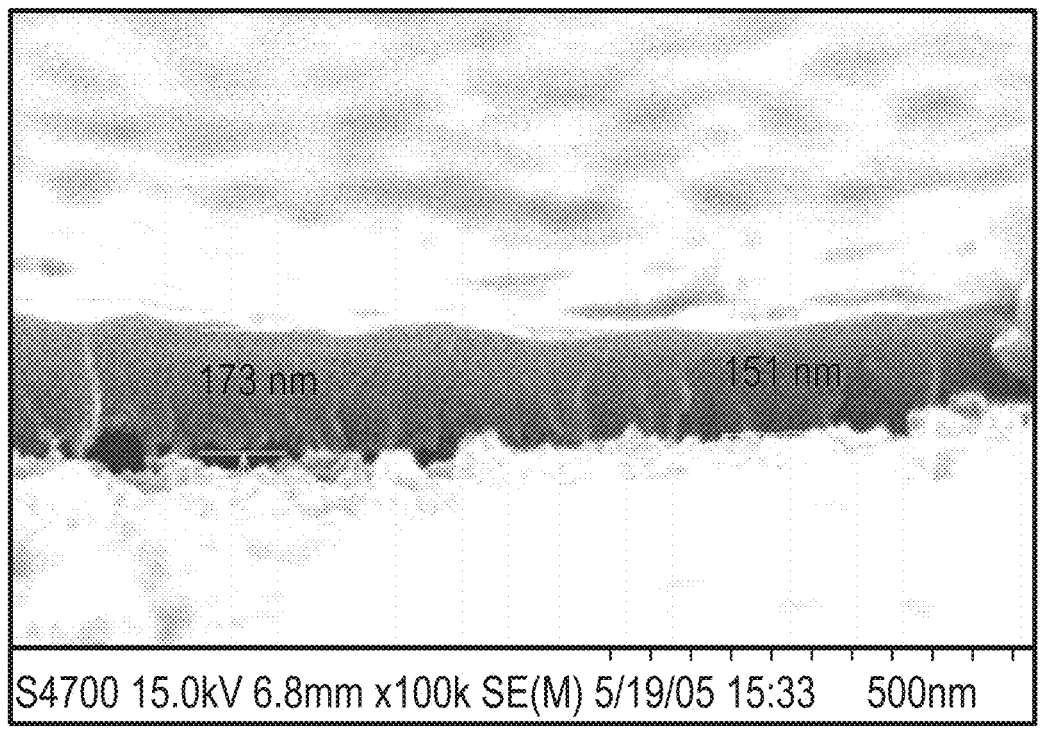
FIG. 15 Shows an SEM fracture cross section of a 150-175 nm thick BPDC aluminosilicate barrier film similar to that shown in FIGS. 2A and 2B.

FIG. 15 Shows an SEM fracture cross section of a 150-175 nm thick BPDC aluminosilicate barrier film similar to that shown in FIGS. 2A and 2B. It can be seen that the BPDC barrier film has planarized the substrate surface and has a smoother continuous surface than the substrate. It is free of porosity, grain boundaries and planarizes the 50-100 nm Ra rough with as little as 150-175 nm film thickness. It is also clear the fractured film pulled up deforming the polymer film due to high adhesion that exceeded the modulus of the polymer.

Figure 20:
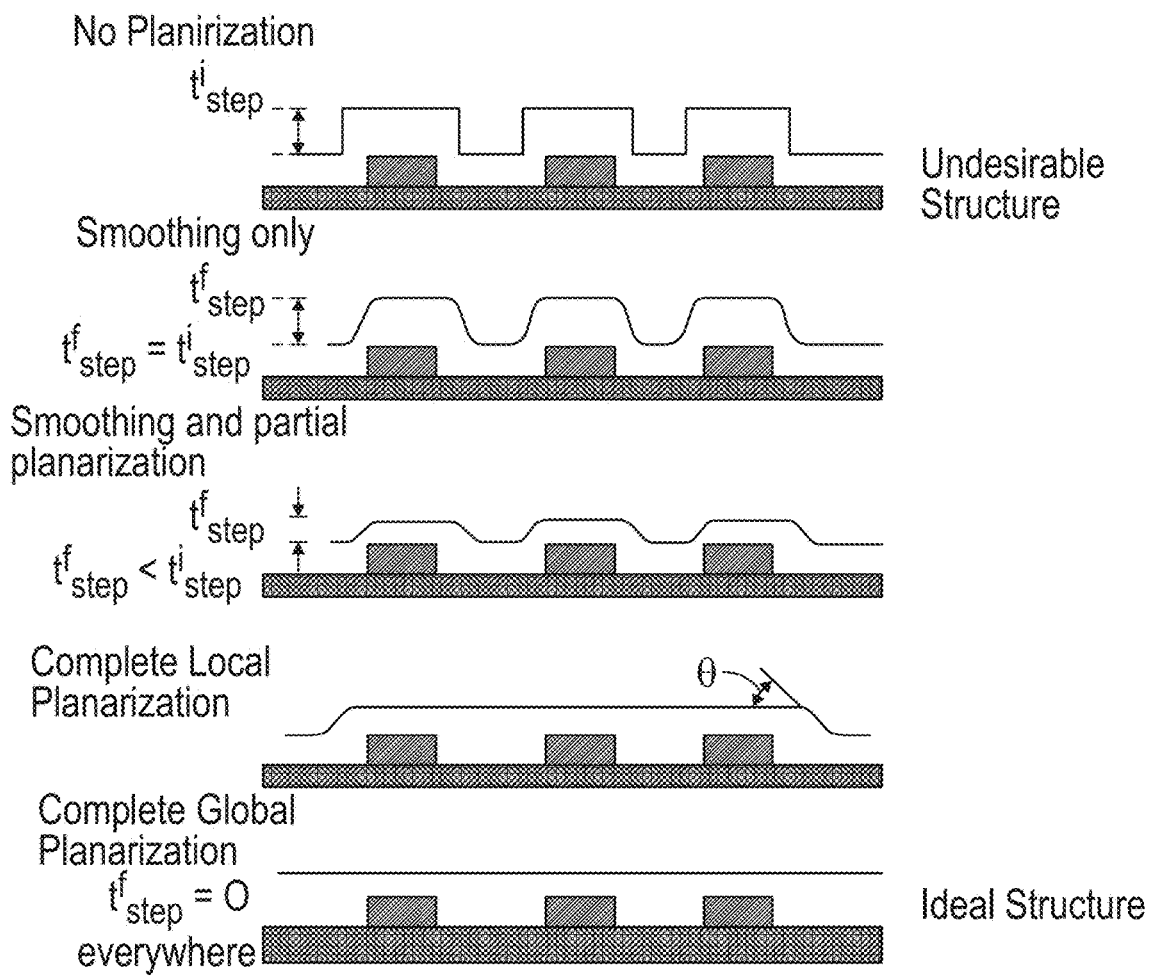
FIG. 20 shows the schematic progression under low temperature bias sputter deposition or high temperature reflow where melting is possible of Planarization classification.

FIG. 20 shows the schematic progression under low temperature bias sputter deposition or high temperature reflow where melting is possible of Planarization classification due to Prof. Krishna Saraswat, Stanford U EE311, Deposition and Planarization Notes, p 20, 2004. With BPDC the ion bias current and Voltage can be selected to provide local planarization of roughness from the atomic to the micron range of film and feature morphology and shapes.

EXAMPLE 1

Preparation of A High Capacity Cathode

The high capacity cathode, as is illustrated in FIG. 10F, includes a high capacity NCM layer 14 on an Al layer 15. The following provides one example of production of the high capacity cathode as illustrated in FIG. 10F. One skilled in the art may devise of other processes to arrive at a high capacity cathode.

High capacity NCM (Ni, Co, Mn) oxide cathode is prepared on aluminum foil as current collector and Li-ion cell assembly with a dry blend preparation: Forty grams (40 g) of lithium cobalt manganese oxide (NCM, Posco ES Materials, Ni:Co:Mn≠8:1:1) is transferred into a ceramic blending jar for planetary ball mill preparation including 0.41 g of conductive additive (ECP, Kejen Black). The NCM blending is carried out with a planetary ball mill with zirconia spherical media at 10 Hz rotation in 60 degrees in inclined jars with 30 minutes total blending time. The quality of the blending can be confirmed by checking visually that all powder should be of the same (gray) uniform color without presence of black particles. All material should be powdery without formation of large aggregates. The powder should not stick to the walls or bottom of the container.

Properly blended NCM powder was sieved through metal mesh into a plastic container. The process is repeated as required a number of times to accumulate an amount of dry blend. A slightly opened plastic container with a suitable dry blend is kept in vacuum oven at 80° C. with −30 kPa vacuum overnight for drying. A binder solution preparation is carried out with an amount of N-methyl pyrrolidone (NMP), poured into a dry clean 600 ml stainless steel (SS) beaker. The SS beaker is securely positioned under an overhead mixer with a 3" high shear mixing blade installed, making sure the blade is centered in the mixing vessel. Mixing is started slowly (200 rpm) to prevent NMP from splashing. Increase speed to 500 rpm or higher to achieve formation of deep viscous liquid vortex. Transfer an amount of polyvinylidene fluoride (PVDF) in small portions into the NMP under intense stirring at 300 rpm overnight until complete observed dissolution of the PVDF is achieved.

A cathode slurry preparation is then carried out by transfer of an amount of binder solution into a SS beaker. The beaker is placed in a water bath for cooling and securely positioned under an overhead mixer. Install and adjust the mixing blade height, making sure the blade is not touching the bottom or inside surface of the mixing vessel. Put mixing blades at the lowest possible position. Start mixing slowly (200 rpm) to prevent solution from splashing. Increase speed to 600-900 rpm (adjust to achieve deep vortex). Weight required amount of dry blend on weighting dish. Slowly add first half of the dry powder into the solution. Adjust the blade's rpm (600-900 rpm) during the powder addition making sure the powder is wetted as soon as it comes in contact with the binder solution. After adding the first increment of powder, mix at 900 rpm for 30 minutes. Make sure the slurry temperature is kept below 50° C. by adding ice in the water bath around the mixing vessel. Make sure the water does not get into the slurry. After the required mixing time, resume slowly adding the rest of the blended powder. Adjust the blade's rpm to make sure the powder is wet as soon as it is added into the mixture. After all the powders are added, mix at 1200 rpm for 60 minutes. Keep slurry temperature below 50° C. by adding ice into the water bath, making sure water does not get into the slurry. After 1 hour mixing at 1200 rmp reduce speed to 900 rpm. Degas the slurry in a vacuum desiccator by pumping out air with diaphragm vacuum pump. Keep the slurry under vacuum for 5 min. Let air in. Repeat a degassing process 3-4 times as needed. Check the slurry for homogeneity and or fineness of grind quality, measure solids content of the slurry using about 2-4 g of slurry by evaporating NMP at 140 C in air oven until constant mass of the slurry sample. If the slurry is homogenous proceed to coat it on aluminum foil (e.g. 15 microns thick) using a roll-to-roll doctor blade coating machine with two hot drying zones 1 meter each. Coat at a speed of 0.3 m/min. Set the first drying zone to 90° C. and the second drying zone was set to 140° C. Set the doctor blade gap to 320 microns or as desired and coat. After spooling the foil, coat the second side with the same settings. In this case the coating will be measured to be loading 50±2 mg/cm$^2$ per side. Adhesion and cohesion of the coating is tested using a tape test for coating quality verification. The coated cathode tape is densified using a calendaring machine with ceramic coated rolls. Set the gap between the rolls to 150 microns to achieve a porosity of about 38%. No cracking or delamination will have appeared in the coating prepared by this process after calendaring. Prepare electrodes of a selected size by punched from a calendared cathode tape. Form 1 cm×1 cm area for terminal attachments and cleaned of any cathode coating leaving clean aluminum foil.

Aluminum tab was used as a positive terminal. Nickel tab was used as a negative terminal. Both tabs have area covered with co-polymer polypropylene (CPP) to provide hermetic seal around the tabs. The tabs were attached to electrodes using an ultrasonic welder.

The stack with attached terminals is surrounded with aluminum laminate packaging material. The packaging material is sealed around the stack using thermal sealer to leave one side opened for optional addition of liquid electrolyte. The cell is then placed into vacuum oven and kept at 100° C. overnight for drying.

A dried cell is transferred into a glovebox filled with a dry gas, e.g. Nitrogen or Argon. A selected volume of electrolyte is optionally added into a cell. The opened side is sealed using thermal sealer inside the glove box to form a battery for initial charging and test where lithium is deposited through the TF-SSE on the anode electrode.

EXAMPLE 2

DC Sputtering With a Conductive Ceramic Target

A conductive ceramic target is prepared by mixing ceramic or semiconducting powders such as metal oxides, nitrides or halides, group 4 or group III/V elements in a selected cationic ratio with a fraction of the corresponding metal by weight or mole percent, by ball mill grinding or similar wet or dry method so as to prepare a mixture that has a metallic fraction of one or more of the constituent elements finely divided. After grinding or ball milling, the mixture is poured or placed in a mold suitable for pressing and consolidating under an atmosphere of rare gas or other gas or Nitrogen or Oxygen or a mixture of gas suitable for formation of the dielectric particles and preservation of a fraction of the metallic particles. The mixture is then subjected to hot isostatic pressing or other similar methods at sufficient pressure and or temperature to form a ridged structural body with a closed density having a remaining metallic or sub-stoichiometric composition. The structural member or plate having a thickness from several mm to a centimeter or more and a size sufficient to cover a sputter target backing plate is prepared by surface grinding such as Blanchard grinding to have a surface finish consistent with or less than the initial particle size as measured by a surface profilometer on an rms basis. A plate is prepared by cutting to form a tile. A plurality of these tiles are placed to cover a sputtering backing plate attached to the plate by soldering with Indium metal or other conductive adhesives.

Figure 16:
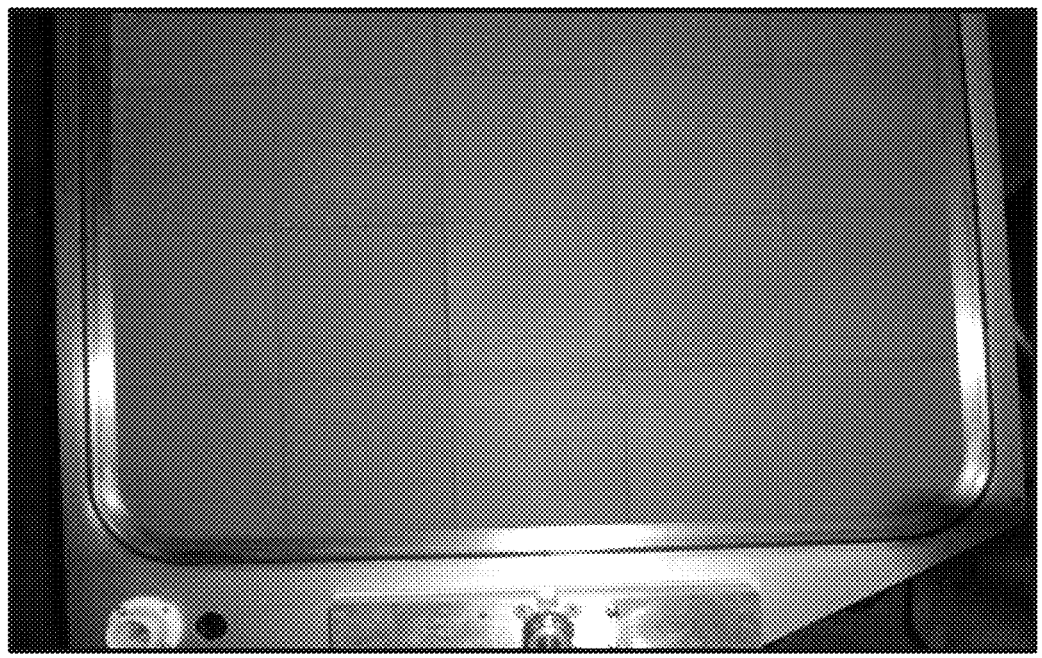
FIG. 16 is a photograph of a conductive ceramic sputter target that can be used in a BPDC deposition chamber.

FIG. 16 is a photograph of an example conductive ceramic $LiCoO_2$ sputter target developed. It is a wide area tiled target developed for wide area high rate BPDC sputtering of $LiCoO_2$ on 450×675 mm substrate with reactive deposition at high rate and ushered in the era of thin film solid state $LiCoO_2$ battery production. Similar targets can be formed as discussed here for deposition of films according to the present invention.

After consolidation, the fraction of metallic content provides sufficiently low resistivity, for example less than about 5 MegOhms and optimally less than 1 MegOhm, that the target can be sputtered by a direct current power source in a sputter chamber. Sputtering can occur in an atmosphere of gas including, but not limited to, Argon or other rare gas and or Oxygen, Nitrogen, Fluorine or other halogen or a carbon containing gas such as CO or $CO_2$, or water vapor in the mTorr range opposite a substrate to be coated. It is to be understood that the presence of the metallic fraction is to provide DC conductivity but the presence of the ceramic or dielectric fraction is to provide anion content to the target so that the surface of the target does not enter a metallic mode during sputter operation due to variation of the gas composition. For example, the presence of oxygen in the target provides a source of oxygen which is a highly efficient electron emitter and modifies the impedance of the magnetron plasma, in some cases lowering the sputter voltage and increasing the current which eliminates the transition to pure metallic phase sputtering and inhibits large swings of voltage (known as hysteresis) wherein metal is deposited. Fast control of the ambient gas so as to stabilize the target in a transition mode, which is a mode between metallic and poisoned, is well known to one skilled in the art. The ceramic fraction of the target provides improved reactive uniformity for all substrates coated by means of high rate transition mode reactive sputtering. Consequently, it is desirable that the conductivity of the conductive ceramic target be low enough for DC sputtering.

EXAMPLE 3

An Anode Current Collector With a TF-SSE and High Capacity Cathode

An anode current collector can be prepared with an anode metal foil sputter coated on one side as illustrated in FIG. 5, or both sides, as illustrated in FIG. 6, with at least one TF SSE layer. The coated foil is then joined in air or under a protective gas blanket with a high capacity cathode prepared according to some embodiments of the present invention. A metal foil having a surface finish of foil is attached to a fixture to be held and placed into a vacuum system to be coated. In some cases, a continuous foil from a roll of foil is loaded into a vacuum system or fed from a roll through an entrance to a vacuum system where said foil is held under tension approximately flat across a table. The table is held at a temperature between 200-450° C., and transported under a sputter source so as to be coated with a back side pressure between 0.5 and 5 mTorr and a table to foil sheet distance so as to maintain a chamber pressure less than about 10 mTorr, which can cool the foil by back side gas so as to maintain a constant temperature such as 250° C. Such foils include Cu or Al or other metallic foil having a thickness between about 5 microns to 100 microns and preferably 8 to 16 microns thickness and a width between 10 cm and 100 cm.

At least one coating is applied to the foil is by means of BPDC reactive sputtering. A reactive gas is introduced containing Argon and either Nitrogen, Oxygen or both so as to maintain a pressure between about 1 to 10 mTorr total gas pressure. A constructive sputter target between 5 and 15 mm thick is bonded so as to cover a backing plate with means of cooling.

Typical pulsed DC sputter frequencies are between 150 and 350 KHz with pulse reversal times of 1 to 10 microseconds for the sputter power. Pulsed DC supplies can use specific reverse times and arc suppression settings for low arc operation and low or selected electrostatic charge and flat band shift of a deposited dielectric film. The roll-to-roll (R2R) process on foil web also allows back side gas cooling for the foil web which can be as thin as 6 to 8 microns thickness. The back-side gas cooling is closely related to fixture or holding the foil or web against the pressure of back side gas that can be used for cooling so as to remove the heat of sputter and bias processes to maintain a constant selected temperature below the softening temperature or other temperature limitations of the substrate. The bias power may be, for example, 1-5 kW m-2 so as to densify the film, eliminate columnar structure, planerize over roughness and form a film with an amorphous morphology. An ion bias current, whether from RF or DC is an efficient means of etching or densifying a film as it is deposited but also heats a film and substrate in vacuum.

EXAMPLE 4

A Single TF-SSE

As illustrated in FIG. 11, and described in U.S. Pat. Nos. 7,238,628 and 8,076,005, a film of $TiO_2$ can be deposited having an amorphous portion 1202 of about 25 nm thickness followed by a microcrystalline portion of about 400 nm thick deposited by BPDC reactive sputtering. Both portions are fully dense but the amorphous portion presents no grain boundaries to the layer upon which it is deposited.

In some embodiment of the present invention, a thin layer of amorphous zirconium oxynitride can be deposited so as to have both the amorphous and microcrystalline morphology of the $TiO_2$ deposited above. The amorphous film can be the precursor of the TF-SSE, and becomes the SSE after a lithiation process from an assembled cathode.

EXAMPLE 5

A Two Sided Anode With TF-SSE Layers and Two High Capacity Cathodes

As illustrated in FIG. 6, a planarized passivating dielectric film such as Ti/TiN with a thickness of between 3 and 4 time the Ra of the anode current collector can be deposited to form a dielectric layer having a continuous dense surface with a roughness less than that of the substrate on both sides of an anode foil. A second layer of Mg2N3 deposited under planarizing conditions forms a planarized or smooth dielectric film, such as that shown in FIG. 15, can be formed on both first-coated sides of the anode foil. A TF-SSE film can then be similarly sputtered on both sides of the anode foil. This results in the layer structure shown in FIG. 6.

A battery can then be formed by joining the double-sided anode to a cathode on each side. Both sides having electrical connections to an external circuit so as to be charged and discharged. Join with two cathode layers as described in Example #1 to form the layered structure as shown in FIG. 8.

Repetition will result in formation of a battery with multiple double-layered anodes, double-layered cathodes, and single electrodes to provide termination at outer surfaces. This process results in optimizing energy density with lowest volume.

EXAMPLE 6

A Planarized Anode Film With a TF-SSE

Figures 18, 19:
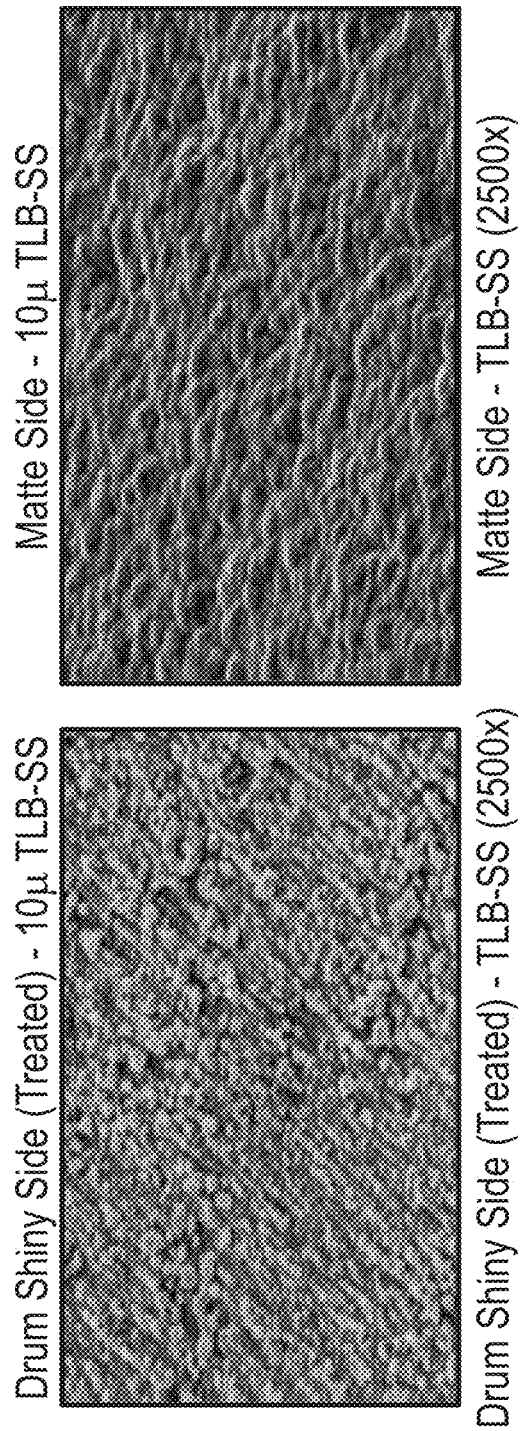
FIG. 18 shows a Cu foil surface morphology micrograph.
FIG. 19 shows a Cu foil specification table showing high roughness.

According to some embodiments, at least some anodes are prepare on a copper foil or an aluminum foil or a substrate that has been coated with Al or Copper having a coated surface roughness of about 0.2 microns Ra as shown in FIG. 17 by first coating the electrode with a layer of about 0.6 to 1.2 microns of Mg3N2 under planarizing conditions at a temperature about 0.2-0.3 Tm and a substrate bias ion voltage between about 10 and 100 Volts so as to form a planarized or smooth film as shown in FIG. 15 which is dense and defect free with respect to continuous coverage of the Ra roughness of the anode. FIGS. 17 and 19 document the measured roughness shown in FIG. 18

FIG. 17 illustrates Cu foil specification chart illustrating surface roughness of some available copper foils. The chart illustrates Cu foils available from PDS Targray ED Copper Foil Rev 4 25 Jan. 2012. FIG. 18 an example Cu foil surface morphology micrograph, one side being a shiny side and a matte side. FIG. 19 illustrate a Cu foil specification table showing high roughness intended to increase polymer adhesion but leading to filament formation and shorting of porous separators.

Some embodiments utilize a foil which has been chemically and or mechanically smoothed prior to sputtering so as to eliminate Rmax asperities shown in FIG. 17 and produce a surface roughness of 50 to 200 nm Ra. In this case a planarized passivating dielectric film with a thickness of between 3 and 4 times the Ra of the anode or foil can be deposited to form a dielectric film having a continuous dense surface planarizing and covering the asperities with a roughness less than that of the substrate. After passivation with a planarizing dielectric film, a TF-SSE film is deposited from a conductive sputter target with a thickness of 0.5 microns to above 2 microns.

EXAMPLE 7

An Integrated HC-TFB With TF-SSE On a Silicon Wafer

On a silicon wafer, deposit and pattern a metal conductor having a surface of Cu or other metal. Prepare an anode electrode having a surface roughness of about 1-40 nm by first coating the electrode with a layer of Ti/TiN under planarizing conditions. After passivation with a planarizing dielectric film, deposit a TF-SSE film by sputtering a layer of dielectric from a conductive sputter target so as to form a continuous layer of electrolyte with a thickness of from 0.5 microns to more than 2 microns. Pattern the TF-SSE so as to form a region on the Cu conductor so as to leave a contact to the underlying anode conductor. Form a battery or capacitor by joining a cathode layer prepared on foil or by direct 3D printing of a cathode prepared as in example 1 with a thickness of 10 to 250 nm upon an area larger than the TF-SSE area on all sides and cure by drying if necessary to form a surface without overhanging edges. Deposit a cathode current collector film as in FIG. 10H, layer 15 and an encapsulation film as layer 16 so as to form a battery connected to an integrated circuit.

EXAMPLE 8

Battery Cell With SSE and Thin Film Layers for Thermodynamic Stability of Li Metal An example cell is illustrated in FIGS. 21A through 21D. An example cell is assembled using a high capacity high loading NCM cathode (14) on 15 um aluminum foil (15). The anode electrode comprises of copper foil current collector (9) with Ti/TiN planarization layer (10) deposited over copper to cover original roughness of the copper foil and form a planar surface. Thickness of the TiN layer is about 0.5 micron. $Mg_3N_2$ layer (11) is formed over the TiN planarization layer using reactive pulse DC sputtering in a nitrogen, ammonia and argon atmosphere using a Mg metal target. $Mg_3N_2$ layer is thermodynamically stable to reduction in contact with Li metal and serves as a protective layer for the Ti/TiN layer. Thickness of the $Mg_3N_2$ is about 50 nm or less. Next is deposited an intermetallic precursor layer 12, which forms an intermetallic with Li that improves wetting affinity to the surface by solid Li metal and, hence, improves uniformity defines the area of the Li metal growth during battery charging. A solid-state electrolyte precursor layer 13 is deposited over the intermetallic precursor layer 12 to provide a thermodynamically stable anode. Assembly of the stable anode with a high capacity cathode (layers 14 and 15) is then provided.

Upon lithiation by charging, an interlayer 17 is formed as well as SSE 18, from the SSE precursor layer 13 as illustrated in FIG. 21B. Interlayer 17 is a Li ion conductor and serves as a protective layer for the SSE 18 from the eventual plating of Li metallic layer 19. Further formation charge is continued at constant current until the cell voltage reaches about 4.35V. Intermetallic layer 12 is lithiated forming intermetallic compound with Li 12. Presence of the Li intermetallic layer 12 lowers surface energy for Li metal plating and improves uniformity of the Li deposit (layer 19) as illustrated in FIG. 21C.

Fully charged cell (FIG. 21C) has delithiated the NCM cathode layer 14 $Li_{1/3}Ni_{0.8}Co_{0.1}Mn_{0.1}O_2$ and formed Li metal layer 21 that includes about half of the Lithium in the initial NCM cathode layer 14, in this case about 44 um. During subsequent cell discharge the Li layer 19 is stripped and Li+ ions move through $Li_3N$ layer 12 and SSE layer 18 and inserted back into NCM cathode layer 14. Depth of discharge (DOD) is limited so that only metallic lithium layer is removed from the anode during discharge leaving other layers on the anode in lithiated state (FIG. 21D) to provide stable cycling and long cycle life. The cell is rechargeable and can be cycled by charge and discharge between states depicted in the FIG. 21C and FIG. 21D.

EXAMPLE 9

Electrochemical Lithiation of Oxide Film From Cathode to Form SSE Layer

This example demonstrates lithiation of an insulating oxide TF-SSE precursor deposited over planarized Ti/TiN on an anode, the lithiation occuring inside a sealed cell from the cathode. A one (1) micron layer of Al—Ti mixed oxide was deposited on copper foil using RF-biased pulsed DC reactive sputtering. Polyimide mask was applied on the copper prior to deposition to have bare copper regions for further electrical conduction. An electrode having 2" X 2" square was covered with the Al—Ti oxide layer and having 1 cm×1 cm bare copper region on one side cut out of the copper foil. Nickel terminal tab was attached to the bare copper region using ultrasonic welding. The tabbed electrode was stacked with same size NCM cathode prepared as described in Example 1. A Celgard 2325 separator was placed between the anode and the cathode. The stack is sealed into aluminum plastic laminate packaging material leaving one side open forming a pouch cell. The cell was then dryed overnight at 80° C. in vacuum and transfered into a dry Argone-filled glovebox. One (1) ml of liquid electrolyte (1M LiPF6 in EC:DEC:DMC=4:4:2 with 2 w. % VC) was injected into the cell inside the Argone-filled dry glove box. The cell was then sealed and compressed between acrylic plates and subjected to the following sequence of charging steps: (1) voltage sweep at 1 mV/sec up to 3.5V then (2) hold at 3.5V for 12 hours.

The equivalent serial resistance (ESR) of the cell was tested during the charge with 1 sec current pulses (0.1 mA increase in current) each 10 min. The ESR was calculated as a ratio of voltage step during the current pulse and the pulse height (0.1 mA). The cell ESR was assumed to be limited by ionic conductivity of the mixed oxide layer and, hence, can be directly used to calculate Li+ ion conductivity evolution during the lithiation process. Conductivity of the mixed Al—Ti oxide layer during lithiation was plotted vs. lithium content in the mixed Al—Ti oxide in FIG. 22. It is clear that initially insulating oxide turned into lithiated layer with ionic conductivity improved by an order of magnitude. Maximal ionic conductivity reached during the lithiation process is estimated to be 2.10-7 S/cm.

Figure 22:
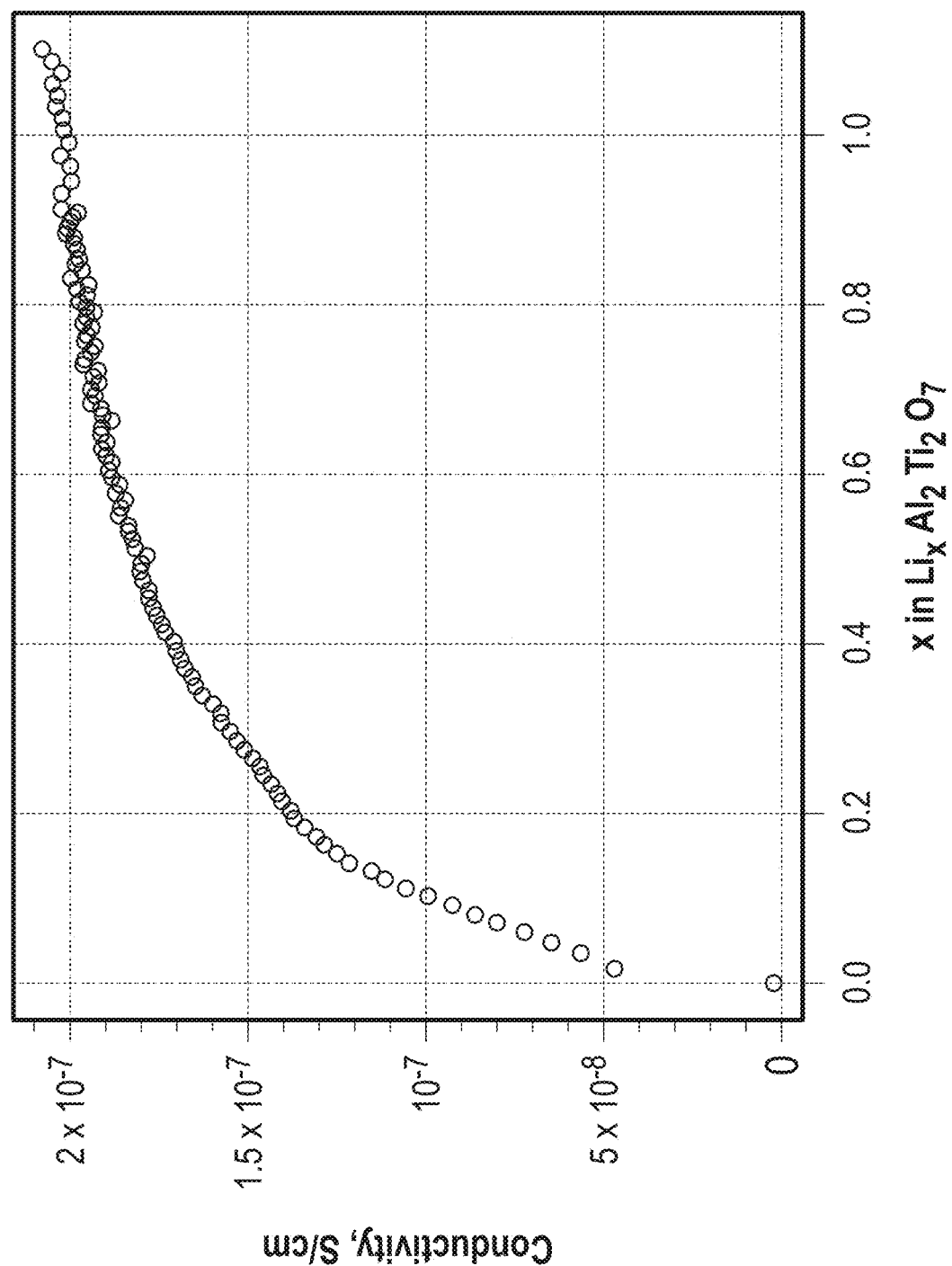
FIG. 22 shows conductivity increase of mixed Ti—Al oxide during electrochemical lithiation from cathode.
Figure 23A:
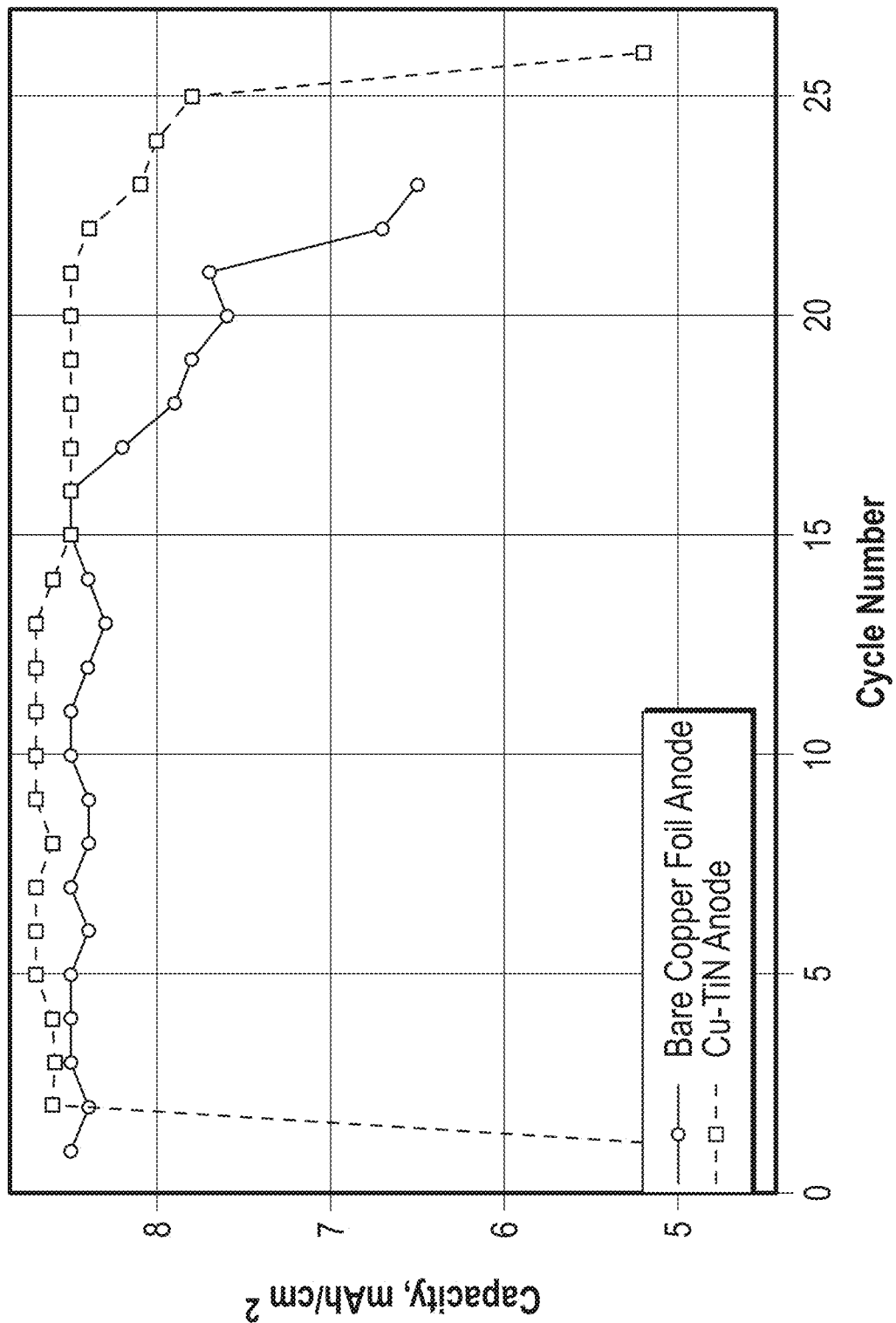
FIGS. 23A, 23B, and 23C shows capacity (a), capacity retention (b) and Coulombic efficiency (c) for two samples, one with depositions on bare copper foil and one with Ti/TiN and oxide film.
Figure 23B:
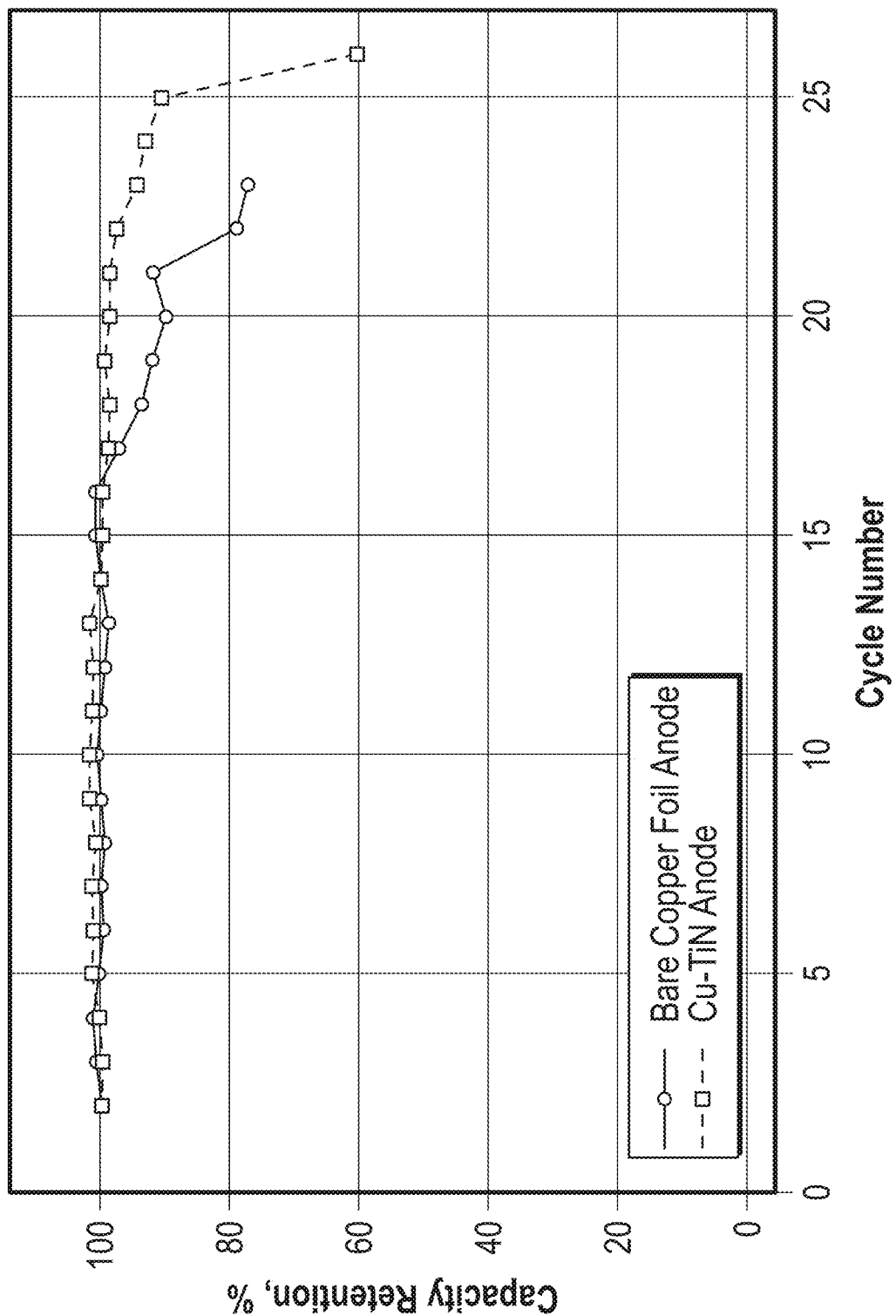
Figure 23C:
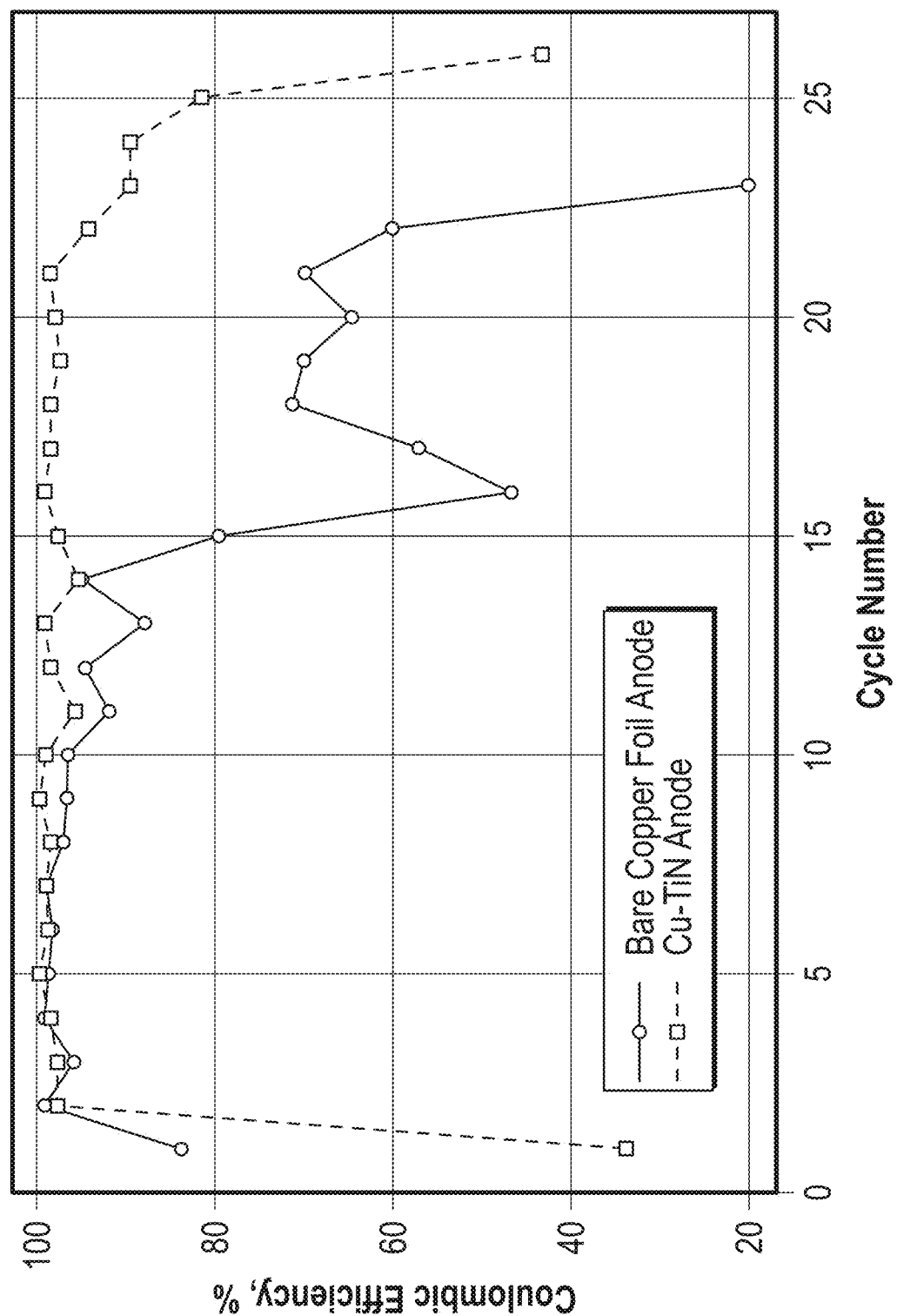

FIG. 22 shows conductivity increase of mixed Ti—Al oxide during electrochemical lithiation from the cathode. FIGS. 23A through 23C shows capacity (A), capacity retention (B) and Coulombic efficiency (C) for two cells with high loading high capacity NCM cathode and copper foil anode. Dark data points show performance of the cell with a layer of Ti/TiN deposited on top of the copper foil anode and light points correspond to the cell without Ti/TiN layer. It is evident from the results that planarization of the rough copper foil anode with Ti/TiN layer improves all three aspects of cycling stability of the cell.

It is to be understood that both the detailed description provided are exemplary and explanatory only and are not restrictive of the invention, as claimed. Further, specific explanations or theories regarding the deposition or performance of any processes according to some embodiments of the present invention are presented for explanation only and are not to be considered limiting with respect to the scope of the present disclosure or the claims. As described below, some structures according to the present invention can have a variable composite index structure through the thickness or across the thickness or both that may facilitate light coupling and transport via bound mode propagation and transformation.

What is claimed is:

1. A device that forms a lithium-metal battery cell upon initial application of a voltage to the device, the device comprising:
   a first electrode structure;
   a second electrode structure containing lithium ions; and
   one or more layers deposited over the first electrode structure, the one or more layers including an electrolyte precursor layer with a planarized electrical insulating ion conducting layer deposited over the first electrode, the one or more layers separating the first electrode and the second electrode,
   wherein the first electrode structure, the second electrode structure, and the electrolyte precursor layer are configured such that, upon initial application of the voltage across the first electrode structure and the second electrode structure to form the lithium-metal battery cell, lithium ions flow from the second electrode structure to the first electrode structure through the electrolyte precursor layer, a lithium conducting electrolyte is formed from the electrolyte precursor layer during lithium ion flow, a layer of lithium metal is deposited on the first electrode structure to form an anode where the first electrode structure and the one or more layers form a current collector electrode, and a cathode is formed from the second electrode structure.

2. The device of claim 1, wherein the one or more layers further includes a protective metal nitride collector film deposited over the current collector electrode to protect the current collector electrode from degradation due to lithium ions and lithium metal.

3. The device of claim 2, wherein the protective metal nitride collector film is a sputter deposited plasma planarized layer.

4. The device of claim 2, wherein the protective metal nitride collector film is an RF biased sputter deposited plasma planarized layer.

5. The device of claim 1, wherein the one or more layers further includes an intermetallic precursor layer.

6. The device of claim 5, wherein, upon initial application of the voltage across the first electrode structure and the second electrode structure to form the lithium-metal battery cell, lithium ions react with the intermetallic precursor layer to form a lithium intermetallic layer for wetting lithium metal upon which the layer of lithium metal is deposited.

7. The device of claim 6, wherein upon charging of the lithium-metal battery cell, lithium ions are reduced at the intermetallic precursor layer upon which the layer of lithium metal is deposited.

8. The device of claim 1, wherein the electrolyte precursor layer includes a planarized thin-film solid state electrolyte precursor.

9. The device of claim 8, wherein, during formation of the lithium-metal battery cell, the planarized thin-film solid state electrolyte precursor layer diffusively conducts lithium ions from the cathode to become a lithium ion containing and lithium ion conducting electrolyte.

10. The device of claim 1 wherein the one or more layers contains one or more planarized layers of a metal nitride, an oxide, a phosphide, a sulfide or a halide compound.

11. The device of claim 1 wherein, after formation of the lithium-metal battery cell, lithium ions diffuse from the second electrode structure through the electrolyte layer and are reversibly reduced to a metallic layer and oxidized to ions on the first electrode.

12. The device of claim 1, wherein the one or more layers includes an RF biased plasma planarized sputtered layer.

13. The device of claim 1, wherein the one or more layers includes a plasma planarized film with an amorphous morphology.

14. The device of claim 1, wherein lithium-metal battery cell is configured to be coupled to an external circuit to provide more than 1 mA-hr/cm$^2$ electrical capacity.

15. The device of claim 1, further including one or more second devices connected to the device to form a lithium metal battery.

16. The device of claim 1, wherein the second electrode structure includes a lithium ion conducting polymer.

17. The device of claim 16 wherein the polymer and second electrode structure form an adhesive layer in contact with the electrolyte layer.

18. The device of claim 1, wherein one of the first electrode layer or the second electrode layer is shared with a second device formed on the device to form a two-sided structure.

19. The device of claim 18, wherein the device is a cylindrical two-sided structure.

20. The device of claim 1, wherein the device is stacked with a second device to form a multilayer device.

* * * * *